(12) United States Patent
Lu et al.

(10) Patent No.: US 12,358,939 B2
(45) Date of Patent: Jul. 15, 2025

(54) METHOD TO SOLUBILIZE BIOMASS UNDER MILD CONDITIONS

(71) Applicant: Wisconsin Alumni Research Foundation, Madison, WI (US)

(72) Inventors: Fachuang Lu, Madison, WI (US); John Ralph, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 646 days.

(21) Appl. No.: 17/836,061

(22) Filed: Jun. 9, 2022

(65) Prior Publication Data

US 2022/0411453 A1     Dec. 29, 2022

Related U.S. Application Data

(60) Provisional application No. 63/208,817, filed on Jun. 9, 2021.

(51) Int. Cl.
    *C07G 1/00*    (2011.01)
    *G01N 21/31*    (2006.01)

(52) U.S. Cl.
    CPC .............. *C07G 1/00* (2013.01); *G01N 21/31* (2013.01)

(58) Field of Classification Search
    CPC .................................. C07G 1/00; G01N 21/31
    USPC ........................................................ 530/507
    See application file for complete search history.

(56) References Cited

U.S. PATENT DOCUMENTS 5,188,673 A    2/1993    Clausen

OTHER PUBLICATIONS

International Search Report and Written Opinion dated Sep. 9, 2022, for PCT Application No. PCT/US2022/032757.
Lu et al. "A facile spectroscopic method for measuring lignin content in lignocellulosic biomass," Green Chem. 2021, 23, 5106-5112.
Bagley, M., Cunningham, R.L. & Maloney, R.L. Ultraviolet spectral determination of lignin. *Tappi* 56, 162-163 (1973).
Björkman, A. Isolation of lignin from finely divided wood with neutral solvents. *Nature* 174, 1057-1058 (1954).
Boudet, A.M., Kajita, S., Grima-Pettenati, J. & Goffner, D. Lignins and lignocellulosics: a better control of synthesis for new and improved uses. *Trends in Plant Science* 8, 576-581 (2003).
Boutelje, J. & Jonsson, U. Ultraviolet microscope photometry of pulp fibers. UV-absorbance and its relationship to chlorine number, kappa number and lignin content. *Cellulose Chemistry and Technology* 14, 53-67 (1980).
Brillouet, J.M. & Riochet, D. Cell-wall polysaccharides and lignin in cotyledons and hulls of seeds from various lupin (*Lupinus* L) species. *Journal of the Science of Food and Agriculture* 34, 861-868 (1983).
Browning, B.L. Methods of wood chemistry, vol. II. (Wiley-Interscience, New York; 1967). (Book—No Copy Provided).

(Continued)

*Primary Examiner* — David T Karst
(74) *Attorney, Agent, or Firm* — Joseph T. Leone; DeWitt LLP

(57) ABSTRACT

A method of completely dissolving lignocellulosic biomass. The method includes the steps of dissolving a sample of biomass in an aqueous solution of strong acid and an amine-thiol to yield a first solution. A method for measuring lignin concentration in biomass via absorbance of the first solution at a wavelength of about 283 nm by comparing the measured absorbance to a standard curve of absorbance values made from solutions of known lignin concentration.

16 Claims, 17 Drawing Sheets

(56) References Cited

OTHER PUBLICATIONS

Chesson, A. Effects of sodium-hydroxide on cereal straws in relation to the enhanced degradation of structural polysaccharides by rumen microorganisms. *Journal of the Science of Food and Agriculture* 32, 745-758 (1981).
Dence, C.W. in Methods in Lignin Chemistry. (eds. S.Y. Lin & C.W. Dence) 33-61 (Springer-Verlag, Heidelberg; 1992).
Fergus, B.J. & Goring, D.A.I. The distribution of lignin in birchwood as determined by ultraviolet microscopy. *Holzforschung* 24, 118-24 (1970).
Freudenberg, K. Beiträge zur Erforschung des Lignins. *Angewandte Chemie* 68, 508-512 (1956).
Fu, L. et al. Rapid and accurate determination of the lignin content of lignocellulosic biomass by solid-state NMR. *Fuel* 141, 39-45 (2015).
Fukushima, R.S., Dehority, B.A. & Loerch, S.C. Modification of a Colorimetric Analysis for Lignin and Its Use in Studying the Inhibitory Effects of Lignin on Forage Digestion by Ruminal Microorganisms. *Journal of Animal Science* 69, 295-304 (1991).
Fukushima, R.S. & Dehority, B.A. Feasibility of using lignin isolated from forages by solubilization in acetyl bromide as a standard for lignin analyses. *Journal of Animal Science* 78, 3135-3143 (2000).
Fukushima, R.S. & Hatfield, R.D. Extraction and isolation of lignin for utilization as a standard to determine lignin concentration using the acetyl bromide spectrophotometric method. *Journal of Agricultural and Food Chemistry* 49, 3133-3139 (2001).
Grabber, J.H. How do lignin composition, structure, and cross-linking affect degradability? A review of cell wall model studies. *Crop Science* 45, 820-831 (2005).
Hatfield, R. & Fukushima, R.S. Can lignin be accurately measured? *Crop Science* 45, 832-839 (2005).
Haw, J.F., Maciel, G.E. & Schroeder, H.A. Carbon-13 nuclear magnetic resonance spectrometric study of wood and wood pulping with cross-polarization and magic-angle spinning. *Analytical Chemistry* 56, 1323-1329 (1984).
Iiyama, K. & Wallis, A.F.A. An improved acetyl bromide procedure for determining lignin in woods and wood pulps. *Wood Science and Technology* 22, 271-280 (1988).
Jiang, N., Pu, Y.Q. & Ragauskas, A.J. Rapid determination of lignin content via direct dissolution and $^1$H NMR analysis of plant cell walls. *ChemSusChem* 3, 1285-1289 (2010).
Kaar, W.E. & Brink, D.L. Simplified analysis of acid-soluble lignin. *Journal of Wood Chemistry and Technology* 11, 465-477 (1991).
Katahira, R., Sluiter, J.B., Schell, D.J. & Davis, M.F. Degradation of carbohydrates during dilute sulfuric acid pretreatment can interfere with lignin measurements in solid residues. *Journal of Agricultural and Food Chemistry* 61, 3286-3692 (2013).
Kleinert, M. & Barth, T. Towards a lignincellulosic biorefinery: Direct one-step conversion of lignin to hydrogen-enriched biofuel. *Energy & Fuels* 22, 1371-1379 (2008).
Kim, H. & Ralph, J. Solution-state 2D NMR of ball-milled plant cell wall gels in DMSO-$d_6$/pyridine-$d_5$. *Organic & Biomolecular Chemistry* 8, 576-591 (2010).
Kim, H. & Ralph, J. Simplified preparation of coniferyl and sinapyl alcohols. *Journal of Agricultural and Food Chemistry* 53, 3693-3695 (2005).
Kirk, T.K., Connors, W.J., Bleam, W.D. & Hackett, W.F., Zeikus, J. G. Preparation and microbial decomposition of synthetic (14C) lignins. *Por. Nat. Acad. Sci. USA* 72, 2513-2519 (1975).

Li, N., Pan, X.J. & Alexander, J. A facile and fast method for quantitating lignin in lignocellulosic biomass using acidic lithium bromide trihydrate (ALBTH). *Green Chemistry* 18, 5367-5376 (2016).
Lu, F. & Ralph, J. Non-degradative dissolution and acetylation of ball-milled plant cell walls; high-resolution solution-state NMR. *The Plant Journal* 35, 535-544 (2003).
Maekawa, E., Ichizawa, T. & Koshijima, T. An evaluation of the acid-soluble lignin determination in analyses of lignin by the sulfuric-acid method. *Journal of Wood Chemistry and Technology* 9, 549-567 (1989).
Moreira-Vilar, F.C. et al. The acetyl bromide method is faster, simpler and presents best recovery of lignin in different herbaceous tissues than Klason and thioglycolic acid methods. *PLOS ONE* 9 (2014).
Morrison, I.M. A semimicro method for the determination of lignin and its use in predicting the digestibility of forage crops. *Journal of the Science of Food and Agriculture* 23, 455-463 (1972).
Morrison, I.M. Improvements in the acetyl bromide technique to determine lignin and digestibility and its application to legumes. *Journal of the Science of Food and Agriculture* 23, 1463-1469 (1972).
Quideau, S. & Ralph, J. Facile large-scale synthesis of coniferyl, sinapyl, and p-coumaryl alcohol. *Journal of Agricultural and Food Chemistry* 40, 1108-1110 (1992).
Ragauskas, A.J. et al. Lignin valorization: Improving lignin processing in the biorefinery. *Science* 344, 1246843: 1-10 (2014).
Rodrigues, J., Faix, O. & Pereira, H. Determination of lignin content of *Eucalyptus globulus* wood using FTIR spectroscopy. *Holzforschung* 52, 46-50 (1998).
Schultz, T., Templeteon, M. & McGinnis, G. Rapid determination of lignocellulose by diffuse reflectance Fourier transform infrared spectrometry. *Analytical Chemistry* 57, 2867-2869 (1985).
Shuai, L. et al. Comparative study of SPORL and dilute-acid pretreatments of spruce for cellulosic ethanol production. *Bioresource Technology* 101, 3106-3114 (2010).
Sluiter, J.B., Ruiz, R.O., Scarlata, C.J., Sluiter, A.D. & Templeton, D.W. Compositional analysis of lignocellulosic feedstocks. 1. Review and description of methods. *Journal of Agricultural and Food Chemistry* 58, 9043-9053 (2010).
Sluiter, A. et al. in Laboratory Analytical Procedure (LAP)—Technical Report (https://www.nrel.gov/docs/gen/fy13/42618.pdf) (National Renewable Energy Laboratory, Golden, CO, USA; 2012).
Templeton, D.W., Scarlata, C.J., Sluiter, J.B. & Wolfrum, E.J. Compositional analysis of lignocellulosic feedstocks. 2. Method uncertainties. *Journal of Agricultural and Food Chemistry* 58, 9054-9062 (2010).
Theander, O. Chemical analysis of lignocellulose materials. *Animal Feed Science and Technology* 32, 35-44 (1991).
Tuck, C.O., Perez, E., Horvath, I.T., Sheldon, R.A. & Poliakoff, M. Valorization of biomass: Deriving more value from waste. *Science* 337, 695-699 (2012).
Upton, B.M. & Kasko, A.M. Strategies for the conversion of lignin to high-value polymeric materials: Review and perspective. *Chemical Reviews* 116, 2275-2306 (2016).
Vanholme, R., Demedts, B., Morreel, K., Ralph, J. & Boerjan, W. Lignin biosynthesis and structure. *Plant Physiology* 153, 895-905 (2010).
Yoshihara, K., Kobayashi, T., Fujii, T. & Akamatsu, I. A novel modification of Klason lignin quantitative method. *Japan Tappi Journal* 38, 86-95 (1984).
Zakzeski, J., Bruijnincx, P.C.A., Jongerius, A.L. & Weckhuysen, B.M. The catalytic valorization of lignin for the production of renewable chemicals. *Chemical Reviews* 110, 3552-3599 (2010).

UV spectrum of dissolved Loblolly pine

METHOD TO SOLUBILIZE BIOMASS UNDER MILD CONDITIONS

CROSS-REFERENCE TO RELATED APPLICATIONS

Priority is hereby claimed to provisional application Ser. No. 63/208,817, filed Jun. 9, 2021, which is incorporated herein by reference.

FEDERAL FUNDING STATEMENT

This invention was made with government support under DE-SC0018409 awarded by the US Department of Energy. The government has certain rights in the invention.

BACKGROUND

Lignin is the most abundant aromatic polymer and the second most prominent renewable raw material after cellulose.[1] In plant cells, lignin cross-links to hemicelluloses and cements cellulose microfibers, enhancing mechanical strength of the plant stem, facilitating the transport of water and nutrients, and providing protection against biological attack.[2-4] Due to the presence of lignin, it is difficult for microorganisms to fully utilize lignocellulosic feedstocks,[5,6] although progress has been made in developing technologies aimed at achieving full and economical utilization of lignocellulosic biomass. These efforts include manipulating the lignification process by mis-regulating genes within the monolignol biosynthetic pathway to produce plants with desirable properties. Known approaches include having low lignin contents and/or modified composition and structure, developing efficient biomass pretreatment processes, and proposing new strategies focused on converting and utilizing the lignin stream up-front.[7-9] In all these activities, as well as in conventional pulping, accurately measuring lignin content in the biomass is one of the important routine practices for biomass compositional analysis in process development and optimization.[10,11]

Many conventional methods have been developed and modified for quantitatively measuring the amount of lignin in certain kinds of plant tissues. The oldest and the most popular method for lignin quantitation, the Klason method, has been used for more than a century.[12-14] During this period, other methods have been proposed, and the options for lignin quantitation have expanded from gravimetric methods to rapid, non-destructive methods using various instruments (e.g., UV, FTIR, NMR, NIR).[15-17] Overall, methods of measuring lignin content can generally be grouped into two categories: direct and indirect quantitation.

The direct methods include the Klason lignin method and the recently proposed ALBTH method.[18] These methods use acids to hydrolyze and solubilize carbohydrates in samples leaving the majority of the lignin as a solid residue to be determined by gravimetric measurement. The Klason procedure uses 72% $H_2SO_4$ followed by more dilute acid hydrolysis to dissolve away carbohydrates, leaving lignin as an insoluble residue.[19] The small amount of lignin dissolved in the acidic solution, called acid-soluble lignin (ASL), is determined by UV spectrophotometry.[20,21] The ALBTH method uses 60 wt % LiBr solution containing 40 mM HCl to dissolve polysaccharides leaving lignin as solid residues, similar to the Klason method.[18] The Klason procedure suffers from labor-intensive and tedious operations. Both the Klason method and the ALBTH method have some shortcomings including potentially insufficient hydrolysis of cellulose and the formation of humins from sugars, which often results in an overestimation of lignin.[18,22,23] Additionally, a relatively large amount of sample is required to produce reliable results by gravimetric measurement. The fraction of acid-soluble lignin, which is significant in hardwood and grass lignins, is measured by UV spectroscopy. The accuracy of those measurements, however, can be degraded by interference from furfurals present in the acid-soluble lignin fraction.

Indirect methods for lignin quantitation include invasive and non-invasive methods. Two invasive procedures (using thioglycolic acid or acetyl bromide) are based on the complete solubilization of whole cell wall material or lignin via sufficient derivatization. The dissolved lignin in solution is then measured by UV spectrophotometry.[10] The thioglycolic acid lignin method has not been widely used because of the lengthy process, its inconsistency with other methods, and the lack of suitable lignin standards required for calibration. The acetyl bromide method is the most popular indirect method for lignin quantitation, largely because of its relative simplicity, the ability to use small samples, and its speed.[24] The method has been modified several times to determine the lignin content in non-woody plant samples.[22,23,25] Briefly, a few milligrams of pre-extracted wood (CWR=cell wall residue after solvent extraction) are placed in a glass vial containing 5 mL of 25% v/v AcBr in acetic acid, sealed with Teflon-lined caps, and heated at 70° C. for 30 min. Lignin undergoes the bromination of α-hydroxy groups and the acetylation of the γ-hydroxy groups and any free-phenolic groups, and is consequently dissolved in the acetic acid. The dissolved lignin is subsequently quantified using ultraviolet (UV) spectrophotometry at 280 nm. Dence[26] cited the advantages of the procedure as being rapid and simple, appropriate for small sample sizes (5-25 mg), with no need to correct for acid-soluble lignin, providing precise absorbance values for determining total lignin content, and having less interference from non-lignin products. However, the furfural products derived from xylan interfere with the UV absorbance of lignin at 280 nm and AcBr lignin values often differ from those from Klason lignin analysis that is still considered to provide the best lignin measure.[10]

Noninvasive methods for lignin quantitation exploit the properties of lignin to absorb radiation in specific regions of the electromagnetic spectrum. Because lignin has stronger absorbance to ultraviolet (UV) light at a wavelength of 280 nm than carbohydrates, UV-microspectrophotometry was applied to measure lignin concentrations in cell walls of specific plant tissues.[27,28] Infrared spectroscopy has been considered as a method for quantifying lignin in samples, particularly with the application of techniques such as diffuse-reflectance Fourier transform spectrometry.[29] Nuclear magnetic resonance spectroscopy (NMR) is a powerful tool frequently used to characterize structural features of lignin, particularly when the lignin-containing samples can be dissolved in, or swollen by, a suitable solvent for solution-state NMR.[30,31] Cross Polarization/Magic-Angle Spinning (CP/MAS) NMR, the spectrum resolution of $^{13}C$-solid NMR has been improved and allowed this technique to be used to analyze lignin in lignocellulosic biomass samples;[32] however, it has not been used routinely for quantification of lignin in whole plant samples.

Although many methods are available for directly and indirectly measuring lignin contents in lignocellulosic biomass, new alternative methods with advantages over the ones currently used are desperately required to streamline analyses.

SUMMARY

Disclosed herein is a new method for completely dissolving lignocellulosic biomass. Also disclosed herein is a spectroscopic method for measuring the lignin content of lignocellulosic biomass by UV spectrometry, based on this complete dissolution. Disclosed herein is a method in which whole biomass is completely dissolved in an aqueous solution comprising a strong acid and a solute comprising an amino functional group and a thiol functional group (i.e., an "amine-thiol"). Once the lignocellulosic biomass has been completely dissolved as described herein, its lignin content is determined via UV spectrophotometry.

Measuring lignin content is a routine operation for biomass compositional analysis. It remains a challenging task that requires multiple steps, uses hazardous reagents, requires heating, and takes a significant amount of time. The facile spectroscopic method disclosed herein was developed to quantify the lignin content of lignocellulosic biomass using a novel method in which biomass samples are dissolved in a strong acid in the presence of an amine-thiol. In the preferred version of the method, the biomass is dissolved in an aqueous solution comprising the strong acid and cysteine. In a specifically preferred embodiment, the biomass is dissolved in an aqueous solution of sulfuric acid ($H_2SO_4$) and cysteine, at room temperature for 1 to 5 hours. In other versions of the method, the aqueous solution contains up to 72% $H_2SO_4$, along with the amine-thiol, and the biomass is dissolved at about 24° C. for no more than 60 min.

Thus, disclosed herein is a method of measuring lignin concentration in biomass. The method comprises dissolving a sample of biomass suspected of containing lignocellulose in an aqueous solution comprising a strong acid and an amine-thiol to yield a first solution. The absorbance of the first solution is measured at a wavelength of about 283 nm. The lignin concentration in the first solution is determined by comparing the measured absorbance to a standard curve of absorbance values made from solutions of known lignin concentration.

The strong acid is selected from the group consisting of chloric acid ($HClO_3$), perchloric acid ($HClO_4$), hydrochloric acid (HCl), hydrobromic acid (HBr), hydroiodic acid (HI), nitric acid ($HNO_3$), phosphoric acid ($H_3PO_4$), and sulfuric acid ($H_2SO_4$). Sulfuric acid is preferred. The preferred amine-thiol is cysteine.

The entire method preferably conducted at ambient, room temperature, roughly 20° C. to 30° C.

In a particularly preferred version of the method, the sample is dissolved in an aqueous solution comprising about 12 M of the strong acid and about 0.1 g/mL of amine-thiol.

Specifically disclosed herein are the following methods:

1. A method of dissolving biomass, including lignocellulosic biomass, the method comprising contacting an amount of biomass with an amount of an aqueous solution comprising a strong acid and an amine-thiol, wherein the amount of the aqueous solution is sufficient to completely dissolve the biomass.

The method of dissolving biomass, wherein the strong acid is selected from the group consisting of chloric acid ($HClO_3$), perchloric acid ($HClO_4$), hydrochloric acid (HCl), hydrobromic acid (HBr), hydroiodic acid (HI), nitric acid ($HNO_3$), phosphoric ($H_3PO_4$), and sulfuric acid ($H_2SO_4$).

The method of dissolving biomass, wherein the strong acid is sulfuric acid.

The method of dissolving biomass, wherein the amine-thiol is cysteine.

The method of dissolving biomass, wherein the strong acid is sulfuric acid and the amine-thiol is cysteine.

The method of dissolving biomass, wherein the method is conducted at a temperature of from about 20° C. to about 30° C.

The method of dissolving biomass, wherein the aqueous solution comprises about 12 M strong acid and about 0.1 g/mL of amine-thiol.

The method of dissolving biomass, wherein the aqueous solution comprises about 12 M sulfuric acid and about 0.1 g/mL of cysteine.

2. A method of measuring lignin concentration in biomass, the method comprising:
   (a) dissolving a sample of biomass suspected of containing lignocellulose in an aqueous solution comprising a strong acid and an amine-thiol to yield a first solution; and
   (b) measuring absorbance of the first solution at a wavelength of about 283 nm; and
   (c) determining lignin concentration in the first solution by comparing the measured absorbance in step (b) to a standard curve of absorbance values made from solutions of known lignin concentration.

The method of measuring lignin concentration in biomass, wherein the strong acid is selected from the group consisting of chloric acid ($HClO_3$), perchloric acid ($HClO_4$), hydrochloric acid (HCl), hydrobromic acid (HBr), hydroiodic acid (HI), nitric acid ($HNO_3$), phosphoric ($H_3PO_4$), and sulfuric acid ($H_2SO_4$).

The method of measuring lignin concentration in biomass, wherein the strong acid is sulfuric acid.

The method of measuring lignin concentration in biomass, wherein the amine-thiol is cysteine.

The method of measuring lignin concentration in biomass, wherein the strong acid is sulfuric acid and the amine-thiol is cysteine.

The method of measuring lignin concentration in biomass, wherein steps (a) and (b) are conducted at a temperature of from about 20° C. to about 30° C.

The method of measuring lignin concentration in biomass, wherein the aqueous solution of step (a) comprises about 12 M strong acid and about 0.1 g/mL of amine-thiol.

The method of measuring lignin concentration in biomass, wherein the aqueous solution of step (a) comprises about 12 M sulfuric acid and about 0.1 g/mL of cysteine.

DETAILED DESCRIPTION OF THE INVENTION

Abbreviations and Definitions

Figure 1A:
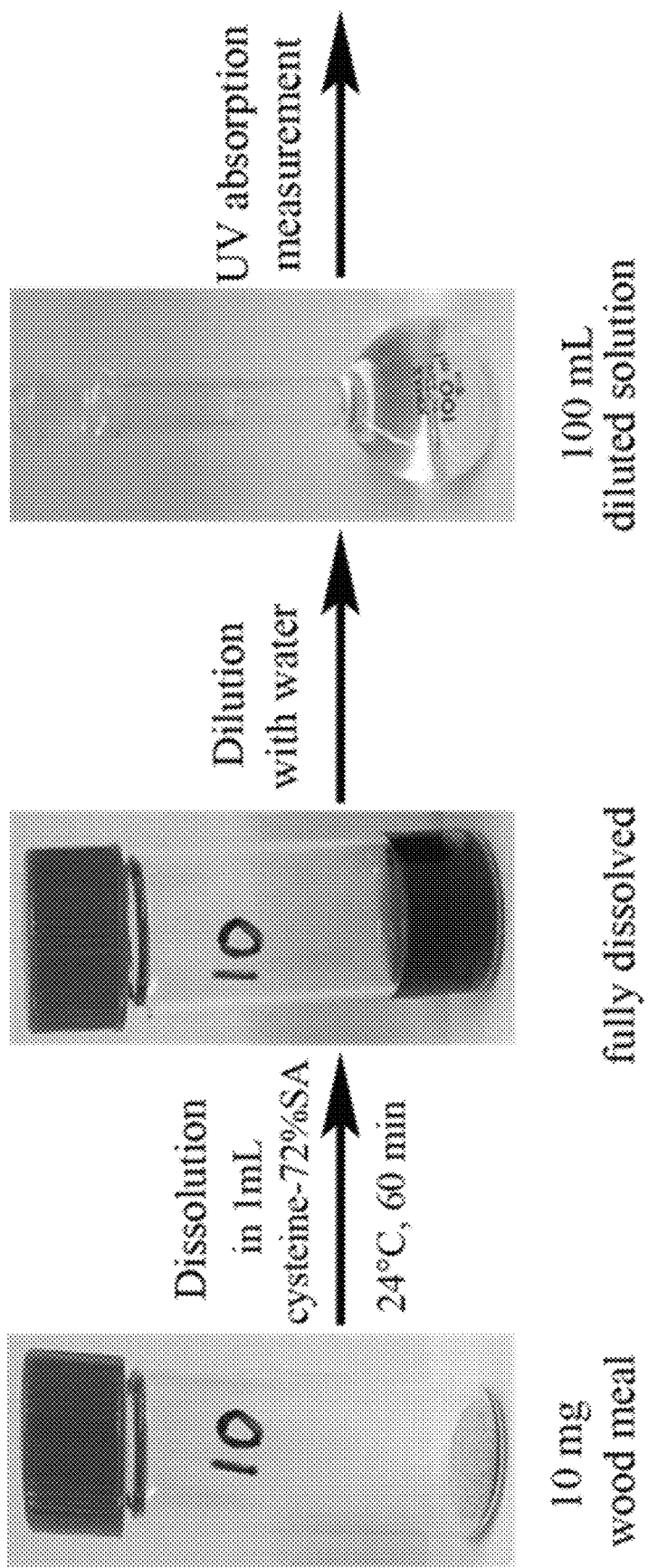
FIG. 1A is a series of photographs illustrating the dissolution of wood meal (Loblolly pine) in an aqueous solution comprising cysteine and sulfuric acid ("SA").

CWR=cell wall residue after solvent extraction. DHP=dehydrogenation polymers (a type of synthetic lignin). The modifiers "G," "S," and "H" designate whether the DHPs contain guaiacyl (G) units, syringyl (S) units, and/or hydroxyphenyl (H) units. DI=deionized. FTIR=Fourier-transform infrared spectroscopy. MWL=milled wood lignin. NIR=near-infrared spectroscopy. NMR=nuclear magnetic resonance spectroscopy. SA=sulfuric acid. UV=ultraviolet spectroscopy.

The term "amine" (or "amino") as used herein refers to —NRR' groups (and the corresponding quaternized cations), wherein R and R' are independently hydrogen, or a substituted or unsubstituted alkyl, alkenyl, alkynyl, cycloalkyl, aryl, aralkyl, heterocyclylalkyl, or heterocyclyl group.

"Thiol" as used herein means the functional group —SH.

An "amine-thiol" is a solute that has a solubility of at least about 0.1 mg/mL in water to miscible in water, comprising an amine functional group and a thiol functional group. The term is very broadly described herein to include any molecule that has at least the stated minimum solubility in water and which comprises an amine group and a thiol group. An amine-thiol may also be further substituted with additional functional groups. Explicitly included within the definition of "amine-thiol" are unsubstituted or substituted, linear, branched, and cyclic $C_1$-$C_6$-alkyl-aminethiols (e.g., 1-aminoethanethiol, 2-aminoethanethiol, aminopropanethiols, aminobutanethiols, aminopentanethiols, aminohexanethiols, aminocyclopropanethiol, aminocyclobutanethiols, aminocyclopentanethiols, and aminocyclohexanethiols), and their linear, branched, and cyclic alkenyl- and alkynyl-analogs. Also included within the definition of amine-thiols are heterocyclic amine-thiols and natural and unnatural thiol-containing amino acids (e.g., cysteine, homo-cysteine, β-cysteine, β-homo-cysteine, and longer homologs thereof).

The term "strong acid" as used herein explicitly includes chloric acid ($HClO_3$), perchloric acid ($HClO_4$), hydrochloric acid (HCl), hydrobromic acid (HBr), hydroiodic acid (HI), nitric acid ($HNO_3$), phosphoric acid ($H_3PO_4$) and sulfuric acid ($H_2SO_4$).

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 1 to 9, from 3.6 to 4.6, from 3.5 to 9.9, and so forth.

All references to singular characteristics or limitations of the present invention shall include the corresponding plural characteristic or limitation, and vice versa, unless otherwise specified or clearly implied to the contrary by the context in which the reference is made. That is, unless specifically stated to the contrary, "a" and "an" mean "one or more." The phrase "one or more" is readily understood by one of skill in the art, particularly when read in context of its usage. For example, "one or more" substituents on a phenyl ring designates one to five substituents.

All combinations of method or process steps as used herein can be performed in any order, unless otherwise specified or clearly implied to the contrary by the context in which the referenced combination is made.

The methods of the present invention can comprise, consist of, or consist essentially of the essential elements and limitations of the method described herein, as well as any additional or optional ingredients, components, or limitations described herein or otherwise useful in synthetic organic chemistry.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The term "contacting" refers to the act of touching, making contact, or of bringing to immediate or close proximity, including at the molecular level, for example, to bring about a chemical reaction, or a physical change, e.g., in a solution or in a reaction mixture.

An "effective amount" refers to an amount of a chemical or reagent effective to facilitate a chemical reaction between two or more reaction components, and/or to bring about a recited effect, such as partial or complete dissolution of solute into a solvent. Thus, an "effective amount" generally means an amount that provides the desired effect.

In general, "substituted" refers to an organic group in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a "substituted" group is substituted with one or more substituents, unless otherwise specified. In some embodiments, a substituted group is substituted with 1, 2, 3, 4, 5, or 6 substituents. Examples of substituent groups include: halogens (i.e., Cl. F, Br, and I); hydroxyls; alkoxy, alkenoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

Dissolution of Lignocellulose Biomass:

In an initial trial to dissolve whole wood meal, a 10 mg sample of loblolly pine wood powder (<0.5 mm particle size) was stirred in 1 mL of aqueous sulfuric acid ("SA") containing 0.1 g/mL of cysteine at 60° C. A homogeneous, purple-colored solution was formed in 30 min, demonstrating that the wood biomass can be quickly and completely dissolved in SA in which cysteine had been added. When the solution was diluted with water to a volume of 10 mL, a clear colorless solution was formed. In contrast, the SA alone produced a fine-solid suspension of a black residue, exactly as normally seen when performing the Klason lignin procedure. When the cysteine concentration in SA solution was reduced to 0.07 g/mL, the wood meal could also be dissolved in 30 min at 60° C. although its diluted solution was pale-yellow colored. The dissolution of the same amount of wood meal was not complete in 30 min when the cysteine concentration was reduced to 0.05 g/mL.

Figure 1B:
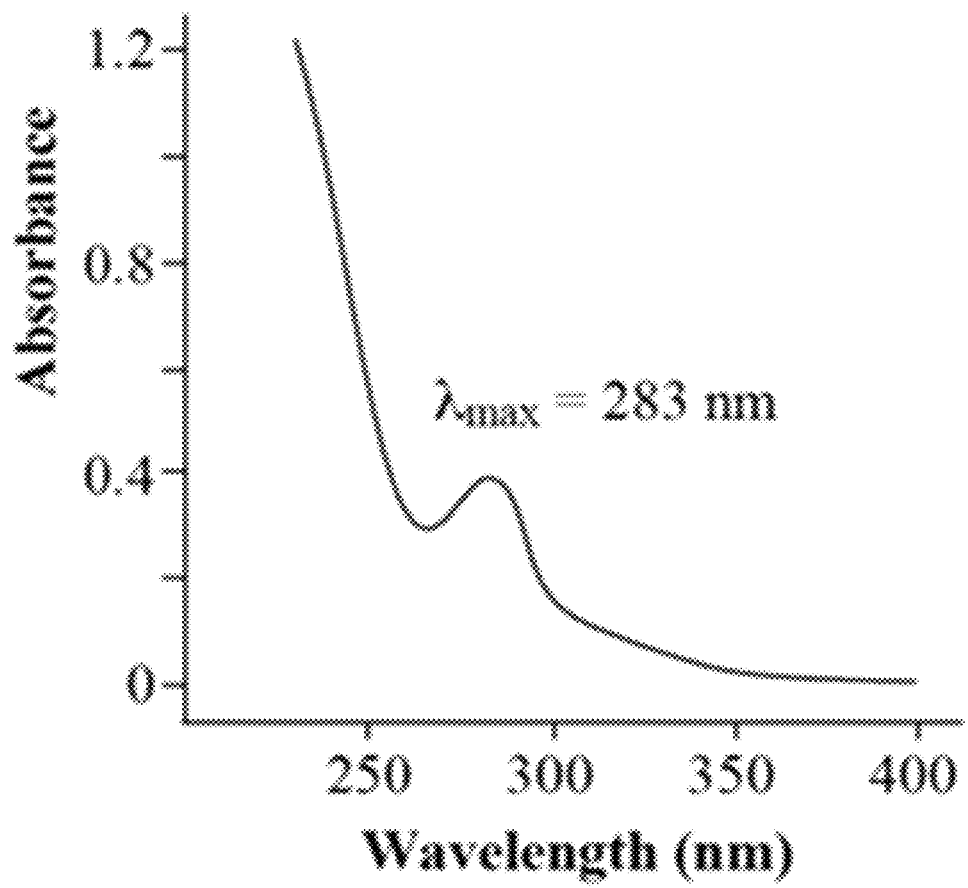
FIG. 1B is a UV spectrum of the dissolved Loblolly pine wood meal shown in FIG. 1A, showing the clear UV maximum at 283 nm for phenolic components that is used for quantification.

The dissolving temperature was decreased to room temperature (24° C.) to identify a milder condition, allowing convenient operation and minimizing interferences from carbohydrates. It was found that lignocellulosic biomass samples were completely dissolved in cysteine-SA solution with 0.1 g/mL cysteine at 24° C. after stirring for 60 min. When the solution was diluted with DI water to a volume of 100 mL allowing appropriate UV absorbance values (0.1-0.9) at λ=283, a clear colorless solution was formed. See FIG. 1A. The UV absorption spectrum of the dissolved loblolly pine wood had a local maximum absorption at λ=283 nm, showing the aromatic characteristic of lignin. See FIG. 1B. The milled wood lignin (MWL) isolated from the loblolly pine wood was also readily dissolved in the cysteine-SA solution under the same conditions, forming a grey-colored solution. The UV absorption spectrum of the dissolved MWL was similar to the one obtained from the dissolved loblolly pine wood or a G-DHP made from coniferyl alcohol. See FIG. 2A. These results indicate that the UV absorption of the dissolved wood was mainly contributed by lignin. When microcrystalline cellulose, glucose, or xylose was dissolved in 1 mL of the stock cysteine solution under the same condition, their UV absorption spectra showed very low absorptivity at 283 nm. See FIG. 2B. These results promoted further investigations into the possibility of developing a simple and fast method for determining lignin content by UV spectroscopy. The method, disclosed herein takes advantage of the ability of the solution of strong acid and amine-thiol to dissolve lignocellulosic biomass. It was therefore decided to use 0.1 g/mL of cysteine in 72% SA as a stock solution to dissolve lignocellulosic biomass at 24° C. and 60 min to produce a stable solution for measuring lignin content with a spectrophotometer.

Figure 3A:
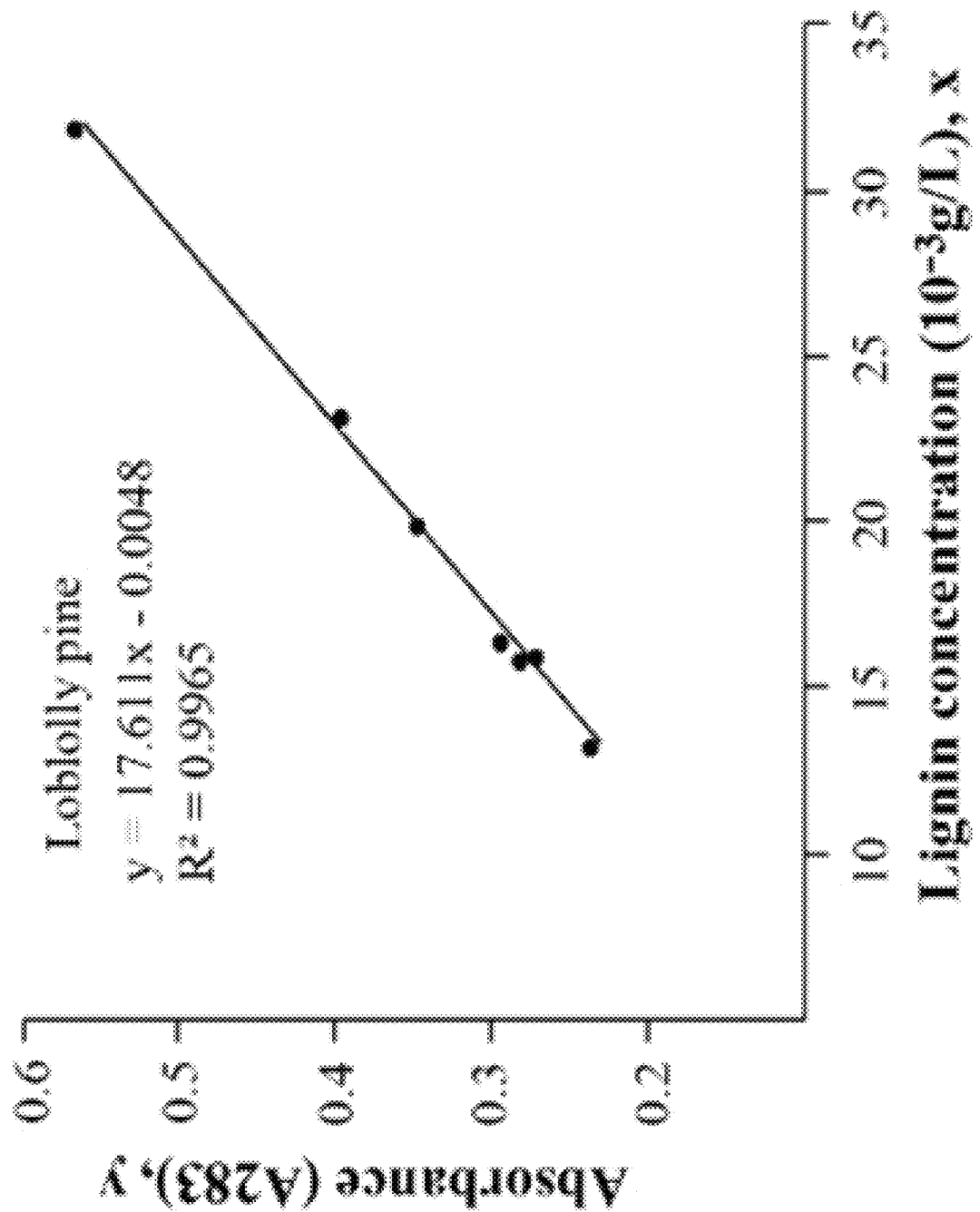
FIG. 3A is a linear correlation between UV absorbance (at 283 nm) of the cysteine-SA-dissolved loblolly pine sample of FIG. 2A and its corresponding lignin concentration as calculated by the conventional Klason method of determining lignin content showing the direct correspondence between the dissolution method and the established Klason method.
Figure 3B:
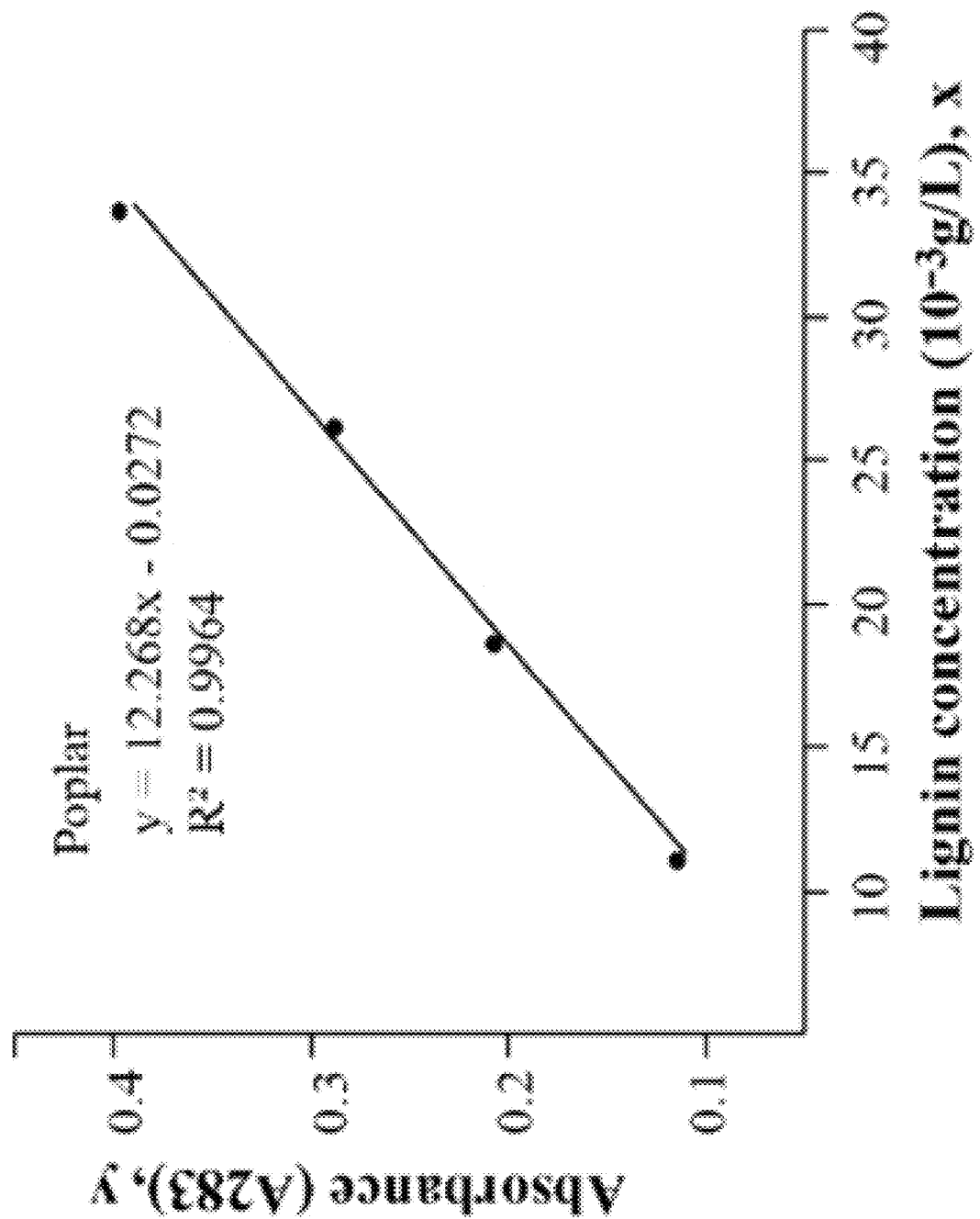
FIG. 3B is a linear correlation between UV absorbance (at 283 nm) of a cysteine-SA-dissolved poplar sample and its lignin concentration as calculated by the conventional Klason method of determining lignin content.
Figure 3C:
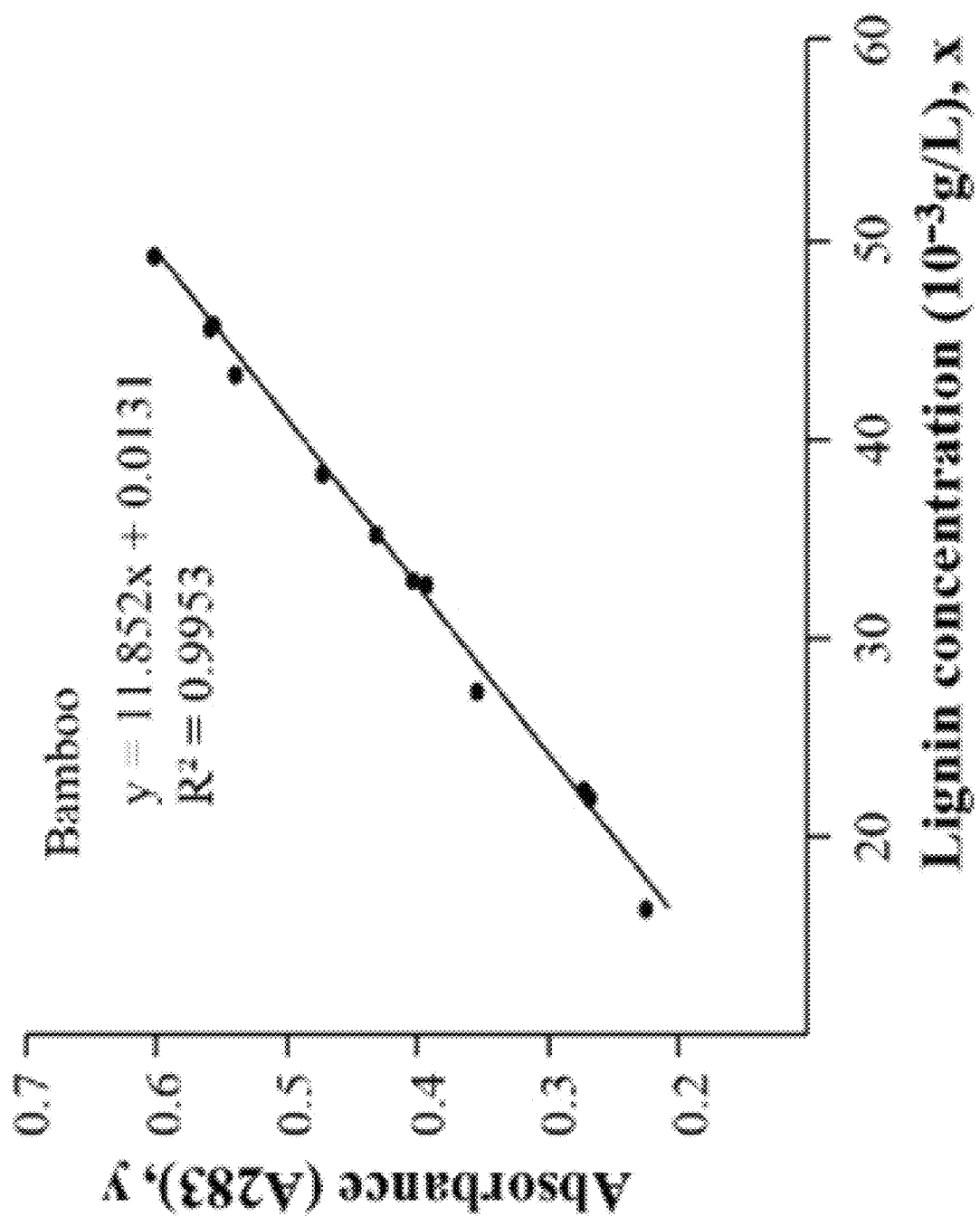
FIG. 3C is a linear correlation between UV absorbance (at 283 nm) of a cysteine-SA-dissolved bamboo sample and its lignin concentration as calculated by the conventional Klason method of determining lignin content.

The Correlation of the UV Absorbance with Lignin Content:

Varying amounts (4-9 mg) of loblolly pine wood meals were stirred in cysteine-SA (1 mL) solution at room temperature (24° C.) for 60 min and the resulting homogeneous solutions were diluted ~100-fold to 100 mL with DI water simply to lower the concentration sufficiently for accurate UV absorption measurement. Absorbance of the diluted solution was measured at 283 nm ($A_{283}$) in a 1 cm quartz cell with a UV spectrophotometer. A very good linear relationship was obtained ($R^2$=0.9965) when a plot was made with the values of $A_{283}$ against lignin concentrations calculated from their Klason lignins. See FIG. 3A. When other lignocellulosic samples such as poplar (FIG. 3B) and bamboo (FIG. 3C) were applied to the cysteine-SA dissolving system, similar results were also obtained.

The Absorptivity of Lignin Treated by Cysteine-SA:

To determine the lignin content from UV absorbance readings, the lignin absorptivity (specific absorption coefficient) needs to be known. This permits calculation of the lignin concentration via the Beer-Lambert equation: A=εbc, wherein where "A" is absorbance, "s" is the specific absorption coefficient (also known as molar absorptivity or the extinction coefficient; units $L·g^{-1}·cm^{-1}$), "b" is the path length of the sample, usually expressed in cm, and "c" is the concentration of the compound in solution, expressed in gram $L^{-1}$.

Figure 2A:
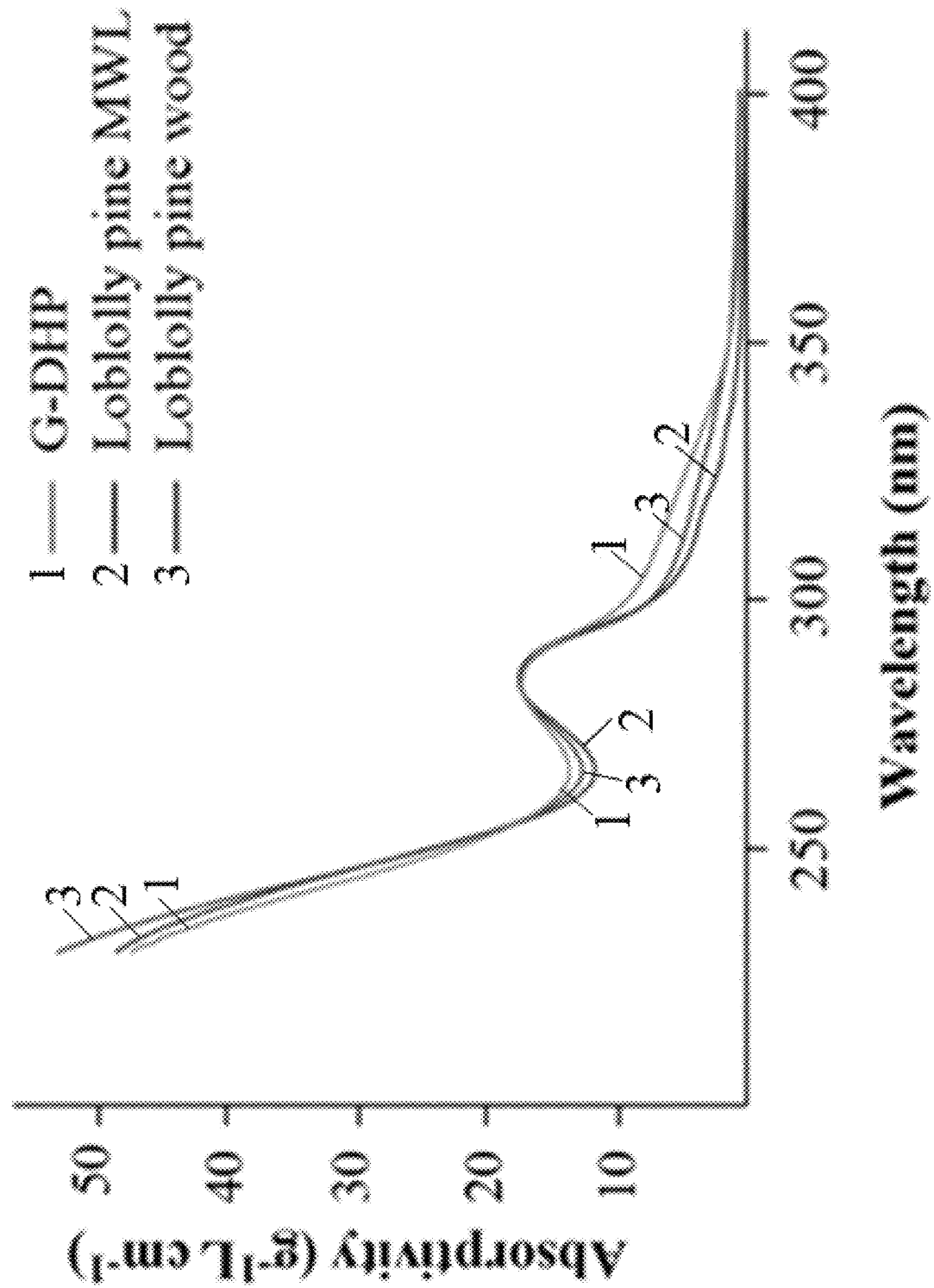
FIG. 2A depicts superimposed UV spectra of a dissolved synthetic lignin dehydrogenation polymer ("DHP") containing guaiacyl (G) units ("G-DHP"), loblolly pine milled wood lignin ("MWL"), and loblolly pine wood.
Figure 2B:
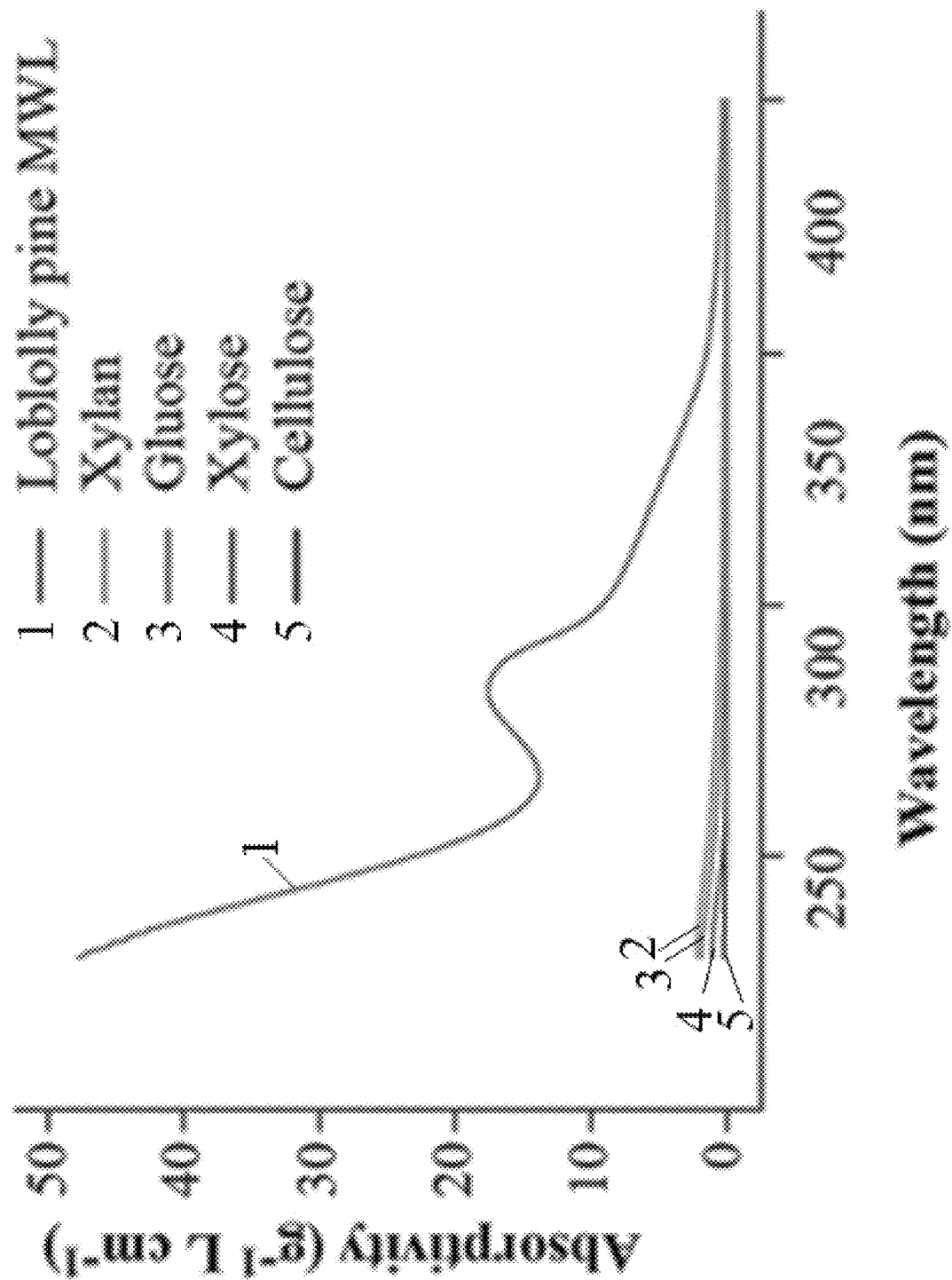
FIG. 2B depicts superimposed UV spectra of loblolly pine MWL, xylan, glucose, xylose, and cellulose dissolved in cysteine-SA.
Figure 2C:
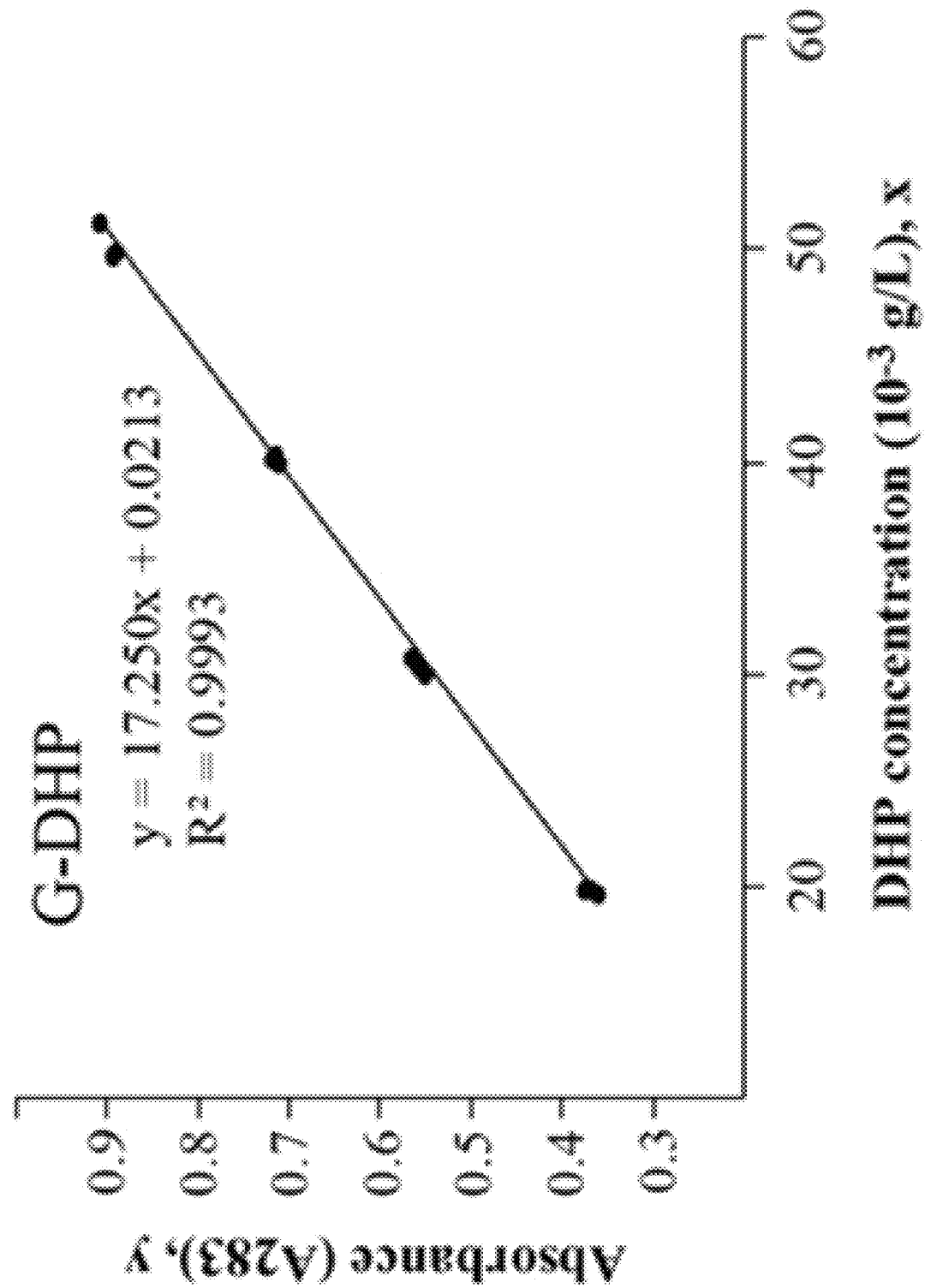
FIG. 2C is a standard curve obtained from a G-DHP, showing its linearity and the slope (absorptivity) of 17.25 $g^{-1} \cdot L \cdot cm^{-1}$.

Synthetic lignins, termed DHPs (dehydrogenation polymers) made from monolignols, were used as lignin standards to develop the standard curves. Five DHP preparations including one G-DHP, three GS-DHPs with different G/S ratios, and one GSH-DHP (Table 1), were synthesized in a biomimetic system using peroxidase-$H_2O_2$ combination as phenol radical initiator according to the conventional "Zutropf" protocol.[33,34] The UV spectrum of the G-DHP treated or dissolved by cysteine-SA solution was similar to those resulting from loblolly pine wood or its MWL (FIG. 2A). The standard curves produced from the G-DHP had a slope of 17.25 (see FIG. 2C), which closely matches the lignin figures obtained from loblolly pine based on its Klason lignin content. These studies yielded an absorption coefficient "s" of about 17.25 $L·g^{-1}·cm^{-1}$ is recommended for the subject method to determine lignin contents in softwood biomass.

Figure 4:
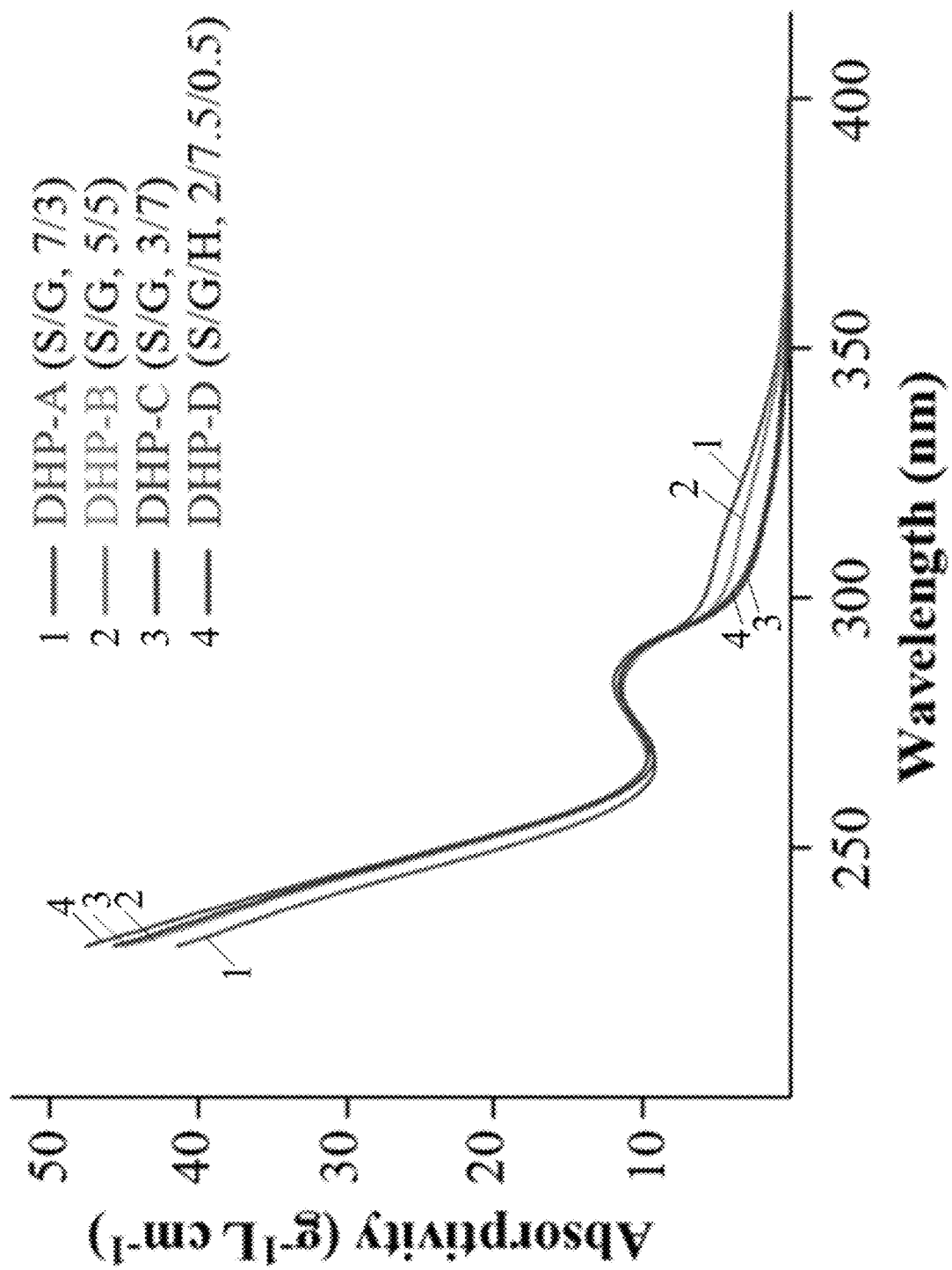
FIG. 4 depicts superimposed UV spectra of DHP-A (100% G), DHP-B (70:30 S:G), DHP-C (30:70 S:G) and DHP-D (20:75:5 S:G:H). (See Table 1.)

The UV spectra of the SG-DHPs (DHP-A, DHP-B and DHP-C) and one SGH-DHP (DHP-D) dissolved in cysteine-SA had very similar absorptivities at λ=283 although their absorptivities varied over wavelengths ranging from 300 nm to 350 nm. See FIG. 4. As G/S increases the absorptivity of the DHP in this range decreases. Although the absorptivity values for DHP-A and DHP-B are almost the same, DHPs with higher G/S ratios generally have higher absorption coefficients. Considering that the G/S ratios for majority of hardwood lignins (SG-lignin) or grass lignins (SGH-lignin) are equal to or less than 1, an absorption coefficient of about 11.23 $g^{-1}·L·cm^{-1}$ is recommended to be used for measuring lignin in hardwood or monocot lignocellulosic materials by the method disclosed herein.

TABLE 1

Molar ratios and absorptivities (ε, at 283 nm) of DHPs dissolved in cysteine-SA.

| | Molar ratios of units | Absorptivity ε, (g$^{-1}$ L cm$^{-1}$) at 283 nm | Recommended ε for lignin quantification |
|---|---|---|---|
| G-DHP | 100 G | 17.25 ± 0.14 | 17.25 (G-lignin) |
| DHP-A | 70 S:30 G | 11.21 ± 0.14 | 11.23 |
| DHP-B | 50 S:50 G | 11.26 ± 0.23 | G/S ratios~1 or less |
| DHP-C | 30 S:70 G | 12.20 ± 0.14 | 12.35 |
| DHP-D | 20 S:75 G:5 H | 12.50 ± 0.08 | G/S ratios~2 or higher |

Figure 5A:
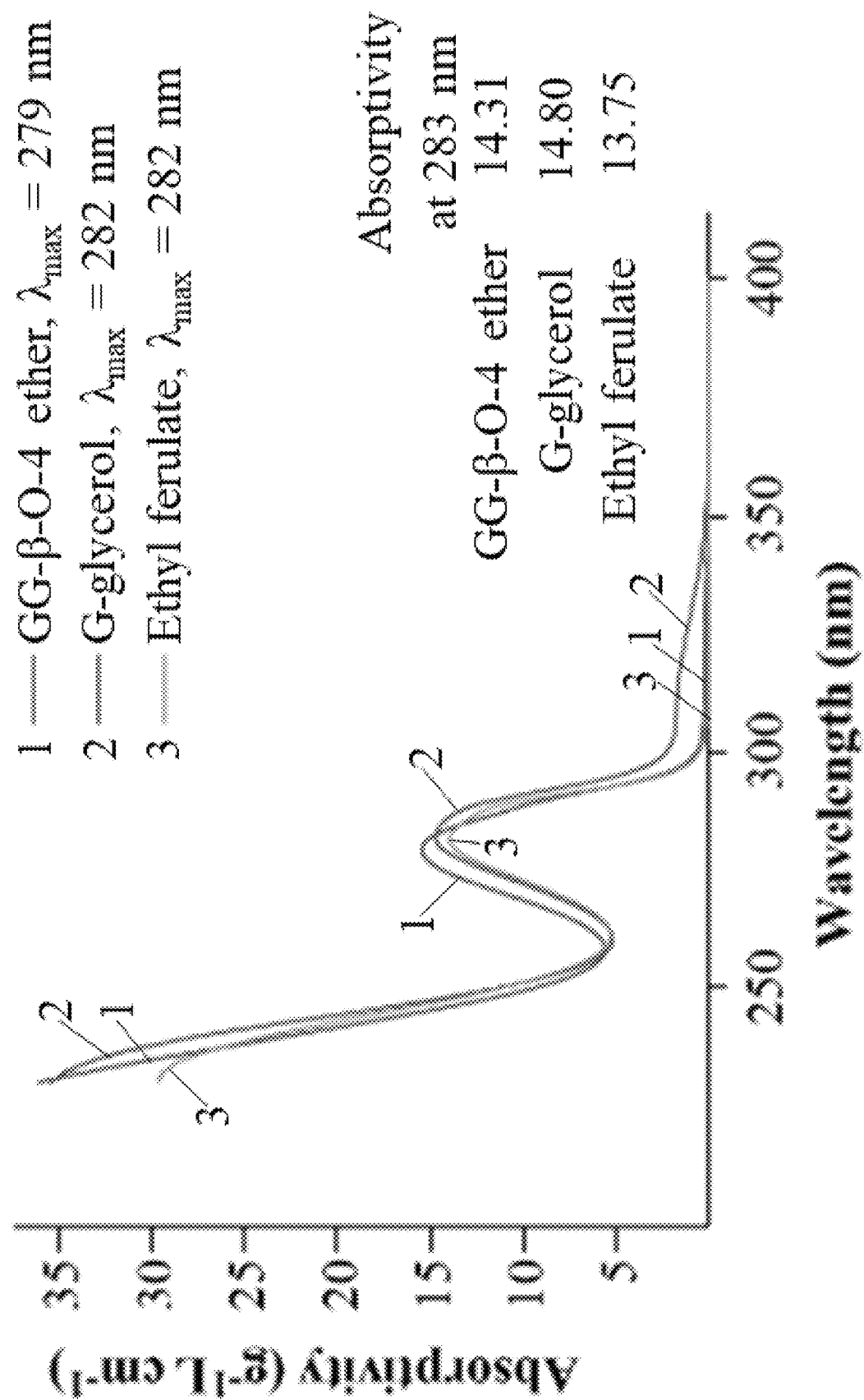
FIG. 5A depicts superimposed UV spectra of GG-β-O-4 ether, G-glycerol, and ethyl ferulate after being treated with cysteine-SA and shows the differences in their absorptivities at 283 nm.
Figure 5B:
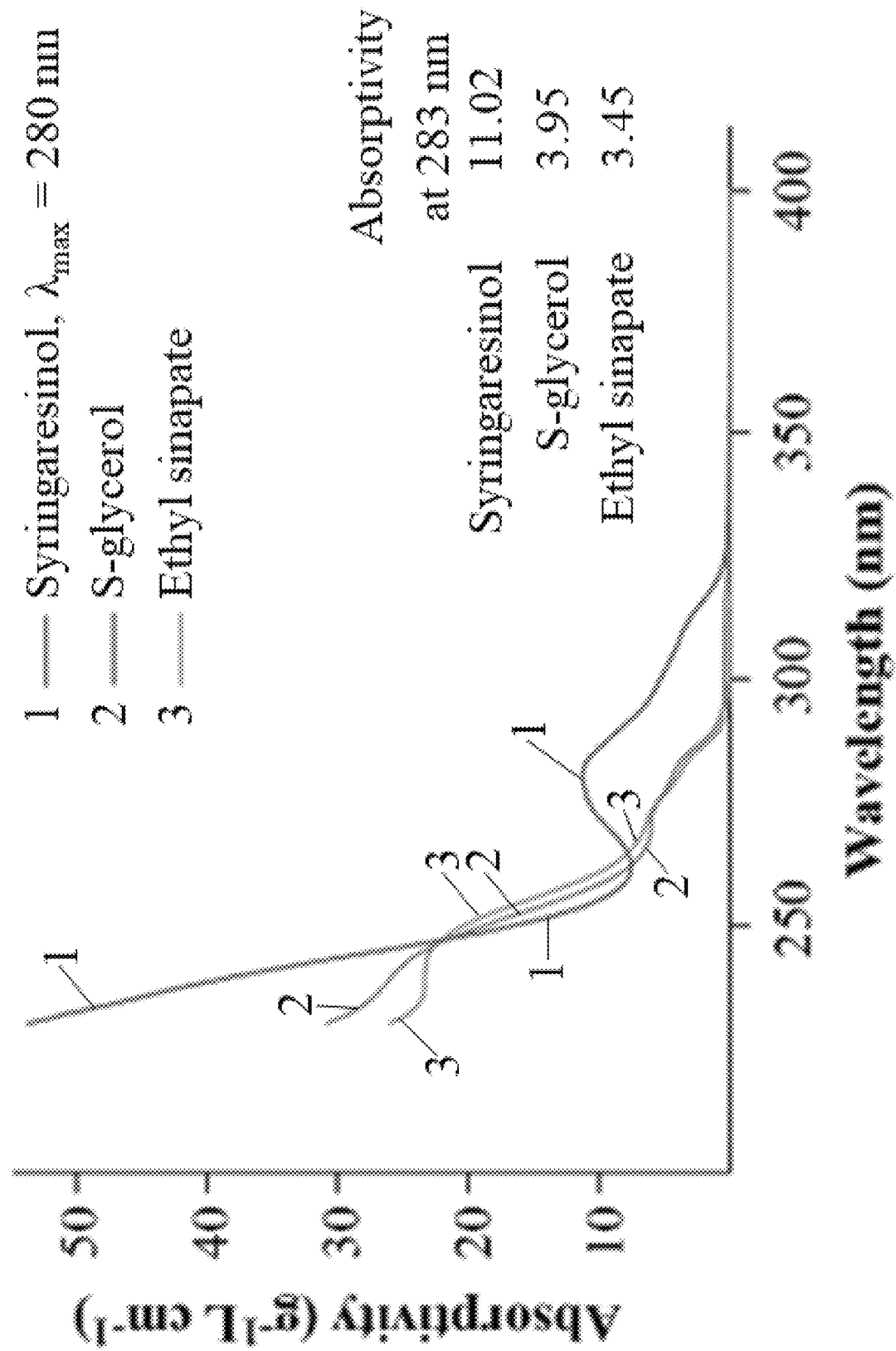
FIG. 5B depicts superimposed UV spectra of syringaresinol, S-glycerol, and ethyl sinapate after being treated with cysteine-SA and shows the differences in their absorptivities at 283 nm.
Figure 5C:
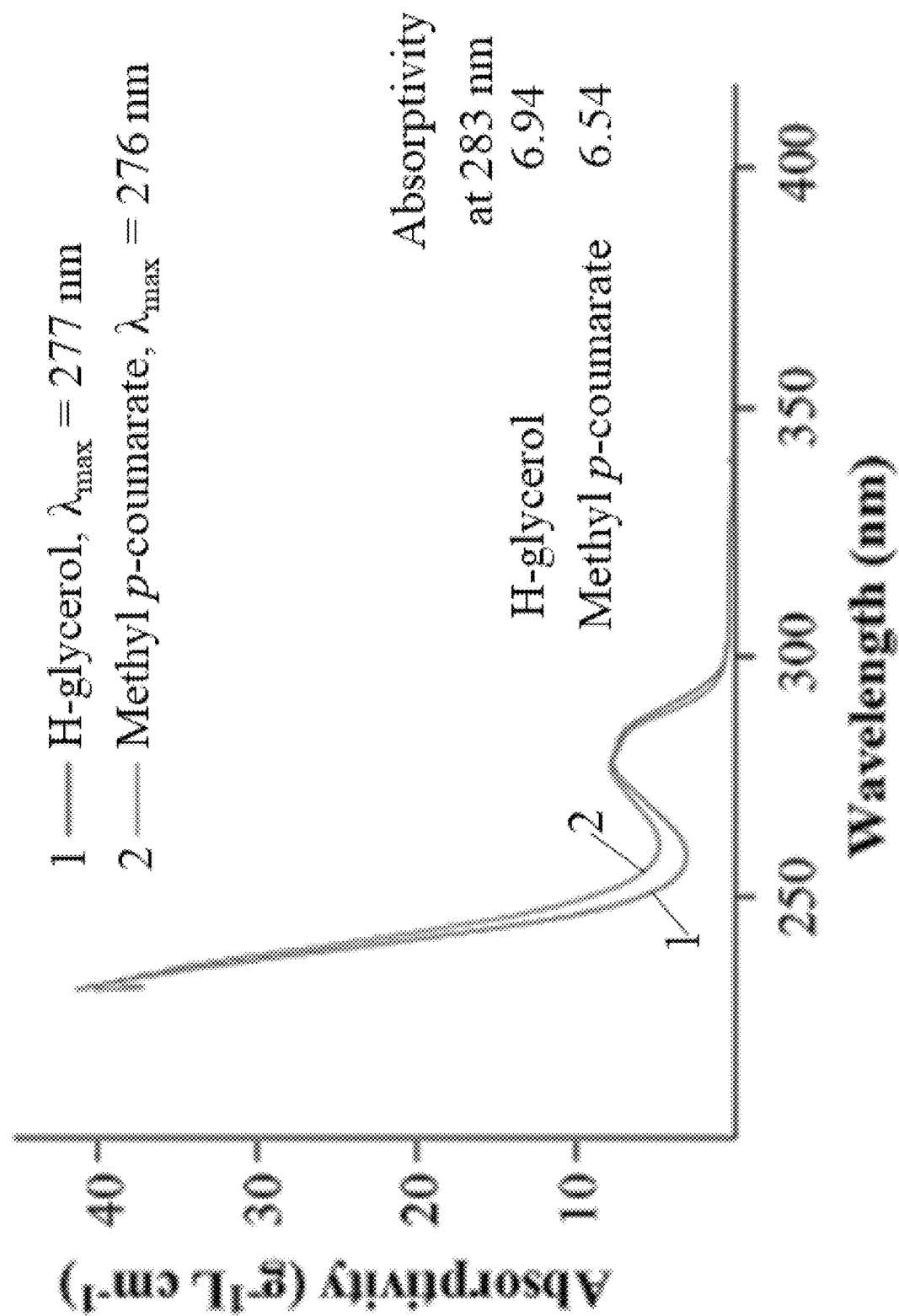
FIG. 5C depicts superimposed UV spectra of H-glycerol and methyl-p-coumarate after being treated with cysteine-SA and shows the differences in their absorptivities at 283 nm.

Absorptivity of Lignin-Related Model Compounds:

To understand how much the various guaiacyl (G), syringyl (S), and hydroxyphenyl (H), units in lignin contribute to its UV absorptivity, eight lignin-related model compounds were treated with cysteine-SA following the same procedure as used for lignin quantification and their UV spectra taken. See FIG. 5A (GG-β-O-4 ether, G-glycerol, and ethyl ferulate), FIG. 5B (syringaresinol, S-glycerol, and ethyl sinapate), and FIG. 5C (H-glycerol and methyl p-coumarate):

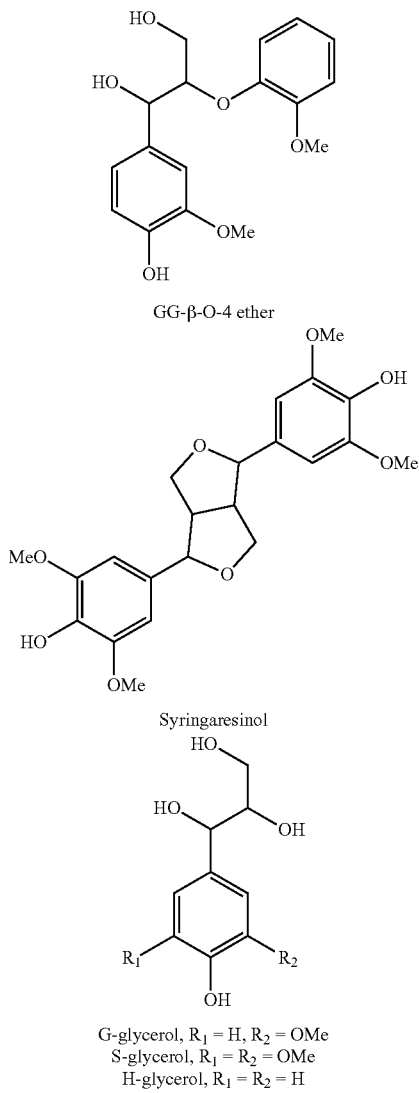

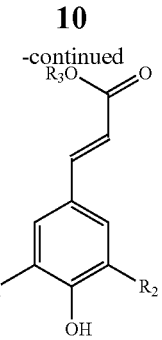

Ethyl ferulate, R$_1$ = H, R$_2$ = OMe, R$_3$ = Et
Ethyl sinapate, R$_1$ = R$_2$ = OMe, R$_3$ = Et
Methyl p-coumarate, R$_1$ = R$_2$ = H, R$_3$ = Me The three G-type compounds had similar spectra, each with a local maximum absorption at around 280 nm and have the highest absorption coefficient at 283 nm among the three types of units (data not shown); When dissolved in the cysteine-SA solution, syringaresinol has a UV spectrum similar to those from hardwood lignins or GS-DHPs. The absorptivity at 283 nm for syringaresinol dissolved in cysteine-SA is 11.02 g$^{-1}$·L·cm$^{-1}$, close to that obtained from DHP-A, although the S type monomers, S-glycerol and ethyl sinapate, had the lowest absorption coefficients of 3.95 and 3.45 g$^{-1}$·L·cm$^{-1}$ respectively. The local maxima at 280 nm are less pronounced for the S monomers tested. The spectra of H type monomeric compounds treated with cysteine-SA showed local maximum absorption around 276 nm in their UV spectra, although their absorption coefficients at 283 nm were relatively low compared to those of DHPs or lignins.

Figure 6A:
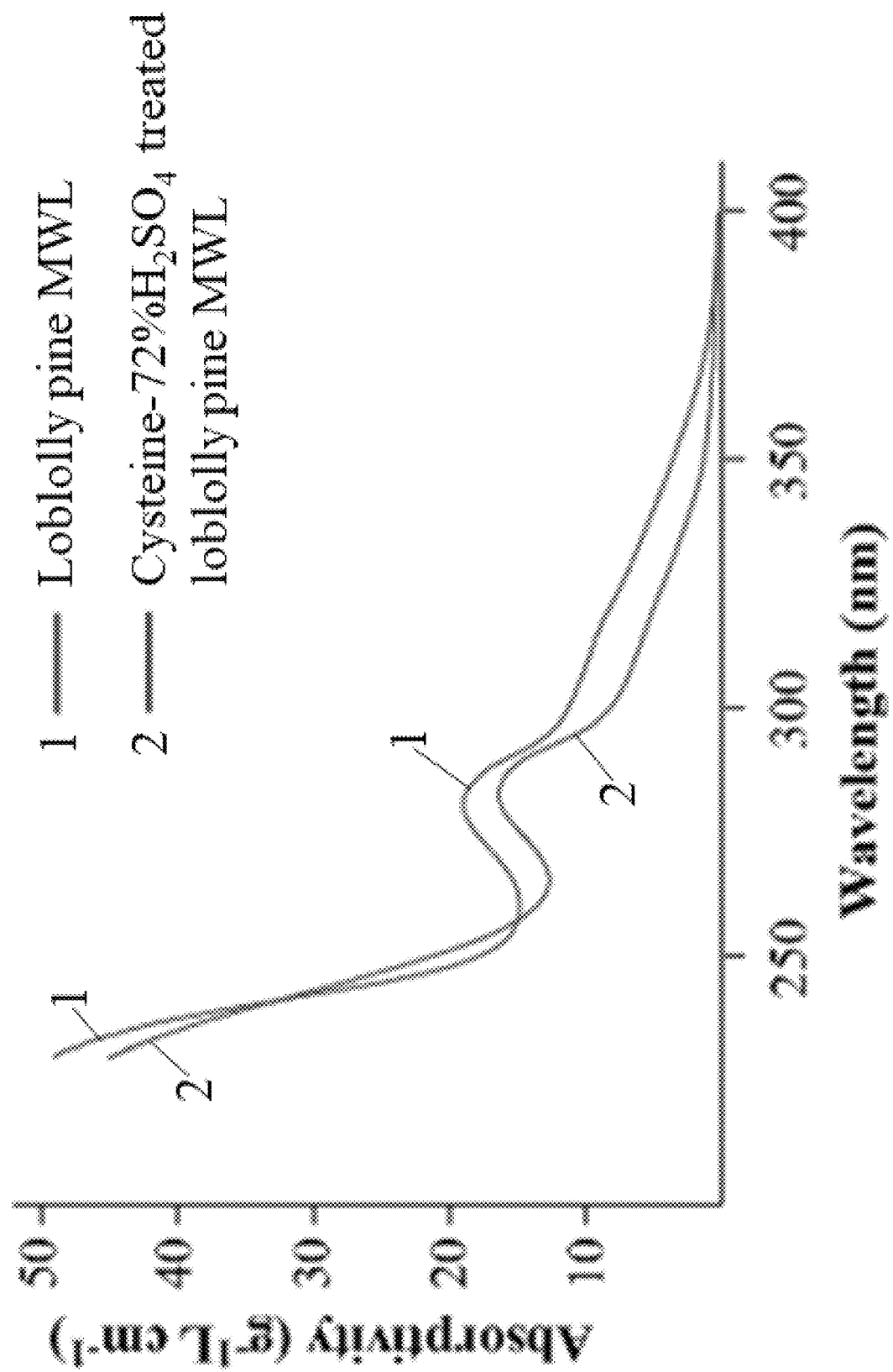
FIG. 6A depicts superimposed UV spectra of loblolly pine milled wood lignin, before and after being treated with an aqueous solution of cysteine and 72% SA and shows the slight shift of higher wavelength of the key lignin absorption peak.
Figure 6B:
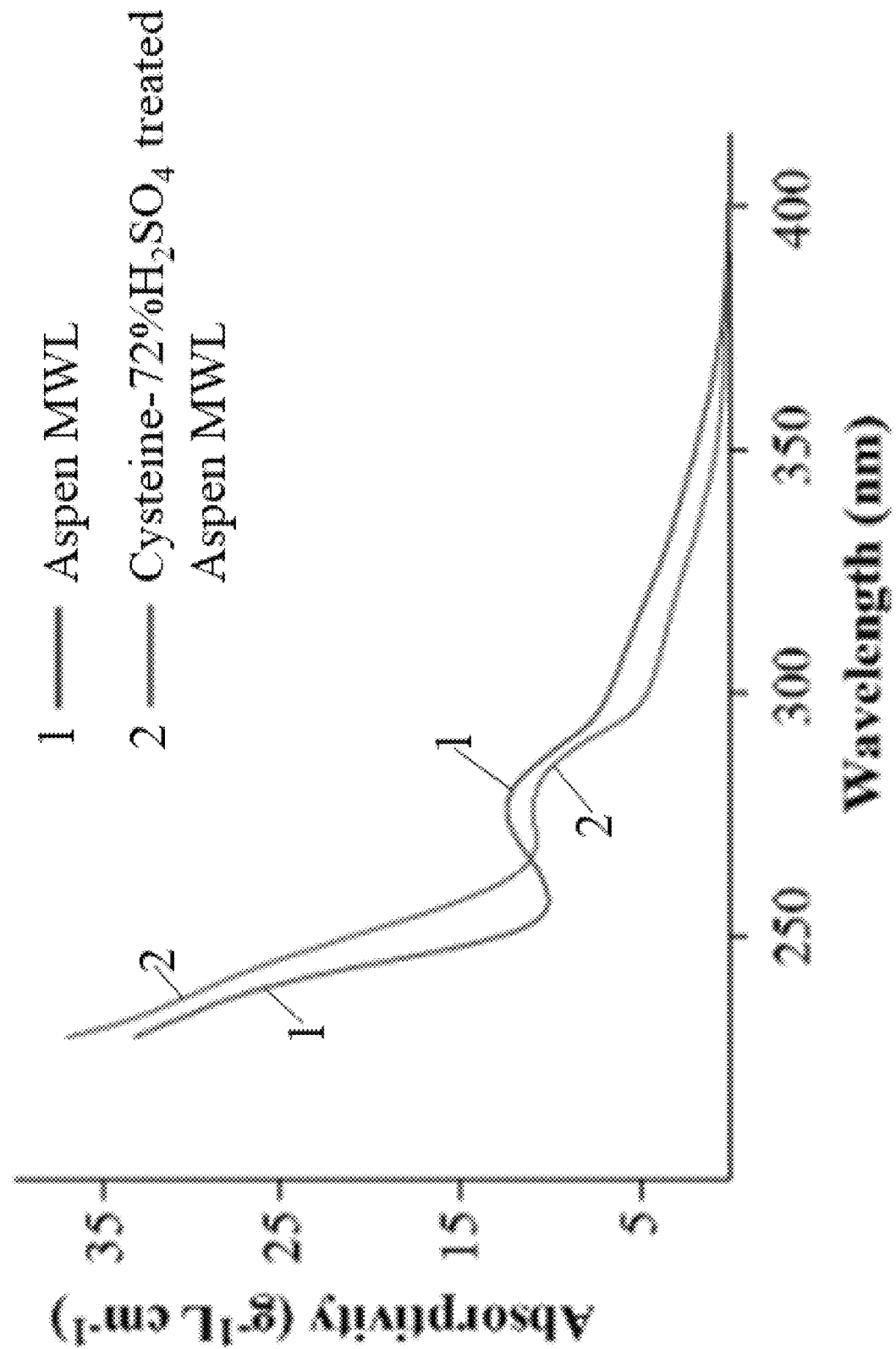
FIG. 6B depicts superimposed UV spectra of aspen milled wood lignin, before and after being treated with an aqueous solution of cysteine and 72% SA.
Figure 6C:
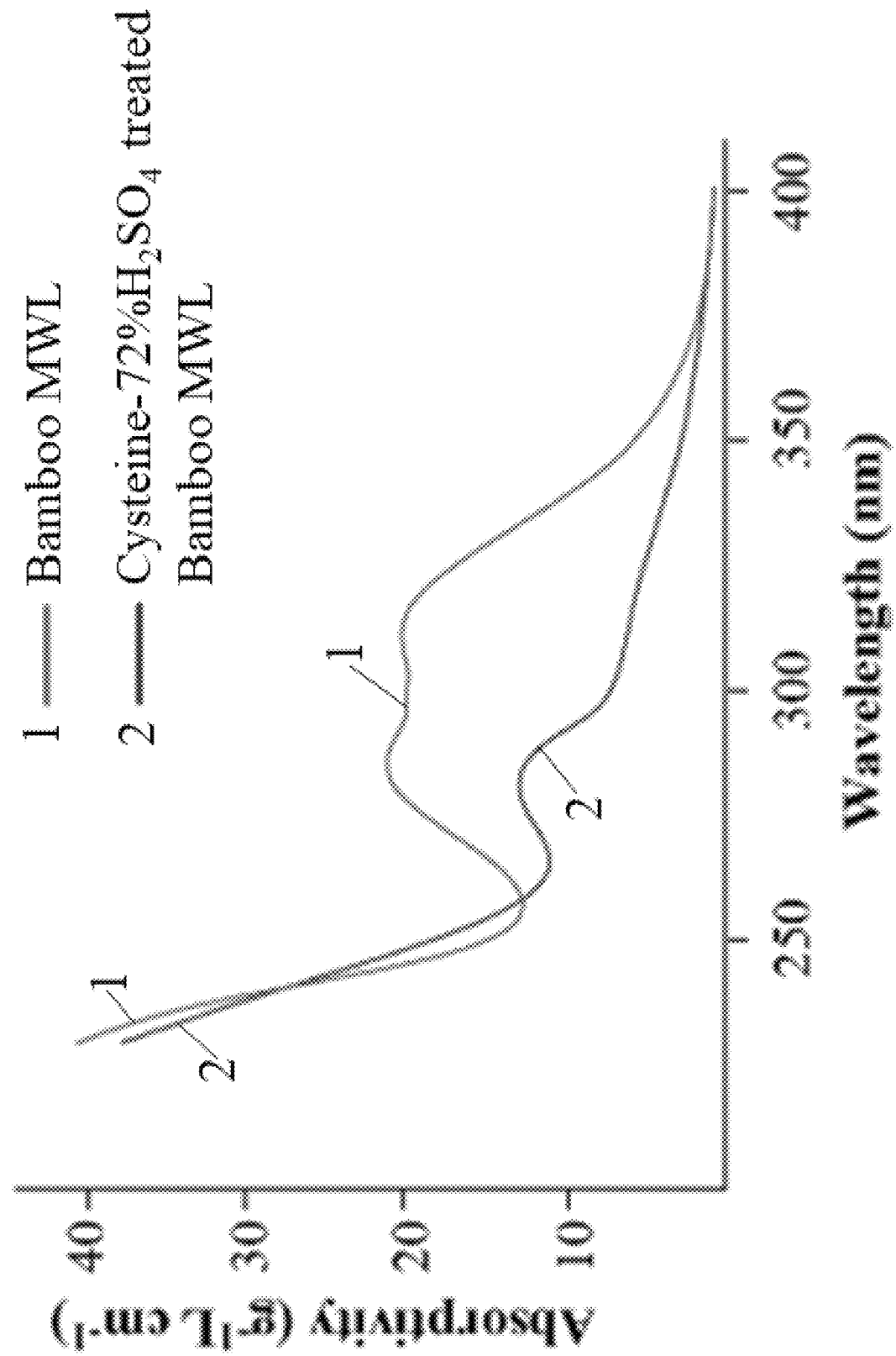
FIG. 6C depicts superimposed UV spectra of bamboo milled wood lignin, before and after being treated with an aqueous solution of cysteine and 72% SA.

Effects of Cysteine-SA Treatment on Spectral Characteristics of Lignin:

To investigate the effect of cysteine-SA treatment on the spectral characteristics of lignins, three isolated lignin preparations (loblolly pine MWL, aspen MWL, and bamboo MWL) were dissolved in cysteine-SA solution under the general conditions and their UV spectra were compared with those of the corresponding lignin samples dissolved in neutral aqueous dioxane solutions. See FIGS. 6A (loblolly pine), 6B (aspen), and 6C (bamboo). Generally, the cysteine-SA changes lignin structures resulting in lower absorptivity, especially for bamboo lignin at λ from 275 nm to 350 nm. Two local maxima absorptions were observed for bamboo MWL in dioxane solution, one is at λ=310 due to the conjugated double-bond of the hydroxycinnamates, mainly p-coumarates, present in the lignin; the other one at λ=286 nm is caused by aromatic rings of lignin units and hydroxycinnamates. After being dissolved in the aqueous cysteine-SA solution, the local maximum at 310 nm disappeared and the local maxima absorption at 286 nm shifted to 282 nm, indicating that the conjugated double-bond was saturated in the strong acid environment with the strong nucleophilic thiol group of the cysteine. This result is consistent with those from the model compounds mentioned above. The UV spectrum of aspen MWL in dioxane had a local maximum at 277 nm, which became a shoulder with lower absorptivity after the sulfuric acid/cysteine treatment. The UV spectrum of the loblolly pine CEL, a G-type lignin (FIG. 6A), was slightly changed by the cysteine-SA treatment, shifting the local maxima absorption from 281 to 283 nm but otherwise retaining its characteristics.

Figure 7A:
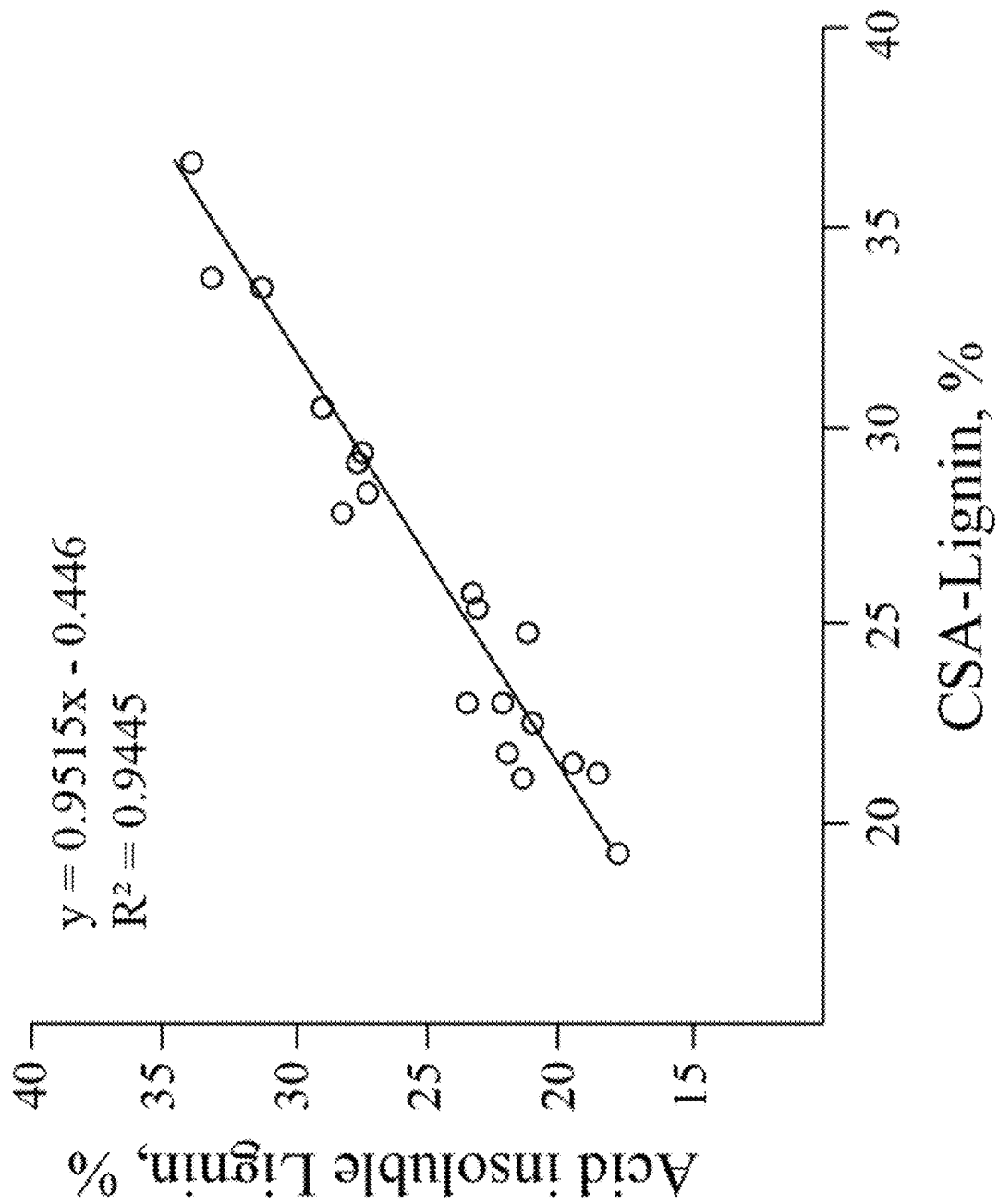
FIG. 7A is a correlation between acid-insoluble lignin as measured according to the method disclosed herein and as measured using the conventional Klason method.
Figure 7B:
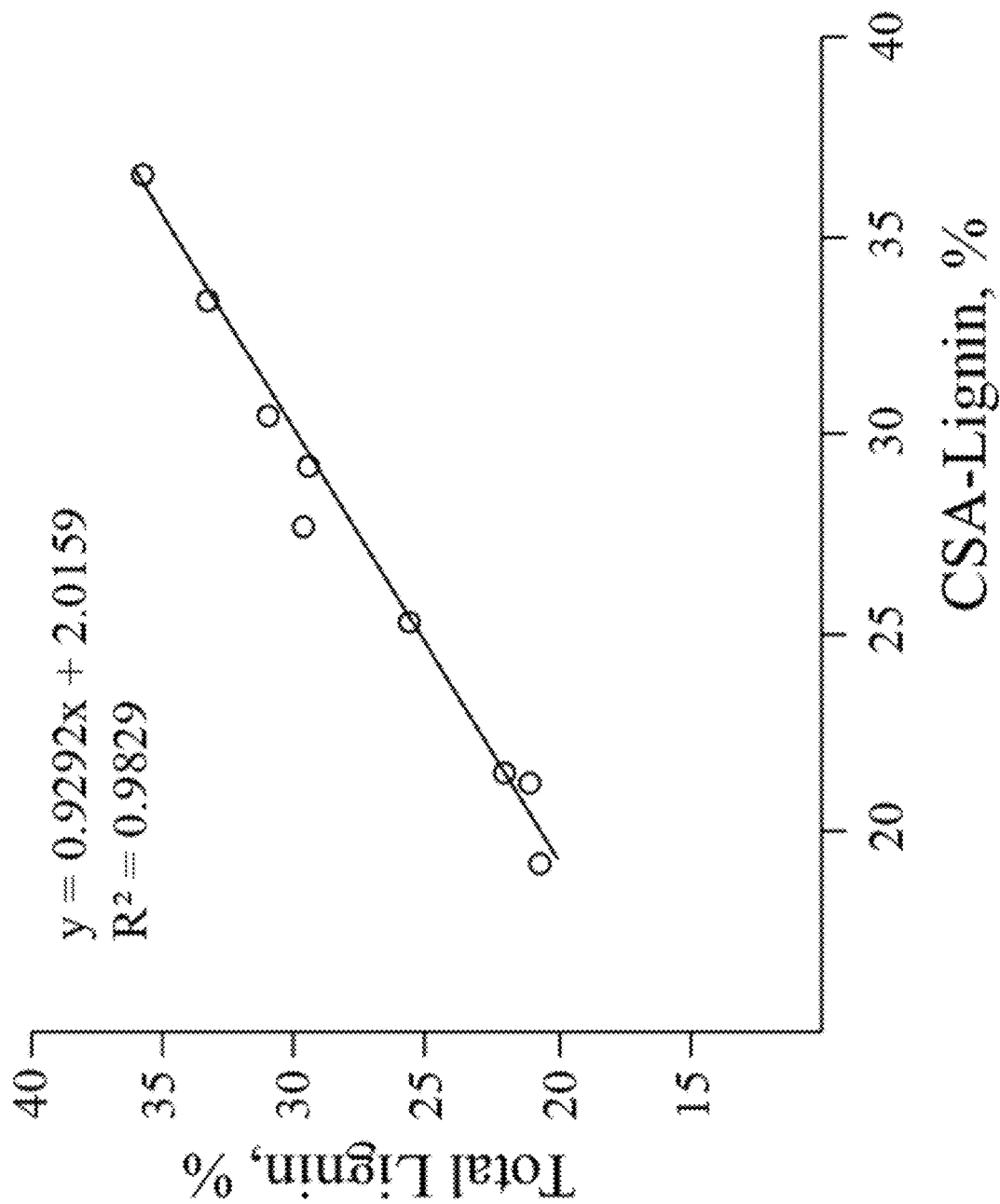
FIG. 7B is a correlation between total lignin as measured according to the method disclosed herein and as measured using the conventional Klason method.

Verification of the Proposed CASA (Cysteine-Assisted Sulfuric Acid) Lignin Method:

To verify the reliability of the method for lignin quantitation, the protocol was applied to various lignocellulosic biomass samples, including 7 softwoods, 6 hardwoods, and 6 grasses (monocots). The results were compared with the acid-insoluble lignin and total lignin contents obtained by the Klason method (the NREL protocol.[12,35] The lignin content as measured by the method disclosed herein are generally slightly higher than the corresponding values generated by the Klason method, but correspond very tightly to the total lignin content as measured by the Klason method. FIGS. 7A and 7B shows the correlations between the lignin content measured by the method disclosed herein and those obtained by the classic Klason method from various lignocellulose materials. All 19 samples were correlated with acid-insoluble lignin contents, and the results from 9 samples were compared with the total lignin contents (acid-soluble+acid-insoluble lignin). A very robust coefficient of determination ($R^2=0.945$) was found between the lignin content as measured by the method disclosed herein and acid-insoluble lignin content as measured by the Klason method. An even more robust $R^2$ of 0.983 was obtained when the lignin content data as measured by the present method were correlated with the total lignin content as measured by the Klason method. These results clearly indicate that the method is useful for measuring lignin content in biomass at room temperature.

Discussion of the Results:

Lignocellulosic biomass is normally not soluble in any solvent. Although isolated or purified cellulose can be dissolved in many solvents and lignin can be partially extracted from lignocellulosic biomass under various conditions, complete dissolution of woody materials requires severe conditions such as intensive ball-milling and/or high temperature in ionic liquids. Acetyl bromide (25%) in acetic acid has been used for dissolving woody materials to measure lignin contents via UV spectrometry. However, acetyl bromide is a corrosive, volatile, and irritating compound such that the experiments are required to be performed within a fume hood. Discovering the extraordinary ability of the combination of a strong acid and an amine-thiol to dissolve lignocellulose materials under otherwise mild conditions (24° C. in 60 min) is striking and wholly unexpected. The method disclosed herein allows lignin content to be measured in a quick, convenient format that requires no heating, a small sample size (1 mg of sample is sufficient), and minimal amounts of reagents and solvents. This method is easily adapted for high-throughput analysis.

By using cellulose, glucose, xylan, and xylose as model substances, the examples contained herein demonstrate that carbohydrates dissolved in cysteine-SA solution under the conditions used (24° C. for 60 min) contributed little to the UV-absorbance at 283 nm. The UV-absorbance at 283 nm could therefore be used for determining lignin in lignocellulosic biomass via spectrophotometry following dissolution of the sample in cysteine-SA (followed by suitable dilution).

As a spectrophotometric method, the method requires a reliable standard for developing standard (calibration) curves. This can be accomplished in several different ways. In the past, several materials have been tested as standards for the acetyl bromide method, including processed lignins,[36,37] MWLs,[38] native lignin,[39] and lignins isolated by acetyl bromide or acidic dioxane[40,41], all of which can be used in the current method. The lignin absorptivity can also be estimated by using wood samples of known lignin content as measured by Klason lignin contents or total lignin contents.[26] Using synthetic lignins (DHPs) as standards (as described herein) has some advantages: 1) the synthesized DHPs are pure and can be readily prepared in adequate quantities; 2) DHPs with varying molar ratios of units can be assessed to study how G/S ratios affect the absorptivity of lignin.

The model studies described herein indicated that guaiacyl-type compounds have higher UV absorptivity (at 283 nm) than those of syringyl or p-hydroxyphenyl compounds, which is consistent with the observation that softwood lignins have higher absorptivity than hardwood or monocot lignins.

The accuracy or reliability of an indirect analytical method always needs to be verified by comparing or correlating to the established method. In this study, the Klason lignin method, the best and most used method for lignin quantification, was compared to the subject method for measuring lignin. The test results with three kinds of lignocellulosic biomass (softwoods, hardwoods, and monocots, with a total of 19 samples) showed that a very good coefficient of determination ($R^2=0.945$) was found between the lignin results yielded by the present method and acid-insoluble lignin contents as measured by the Klason method, and that an even better $R^2$ (0.983) was obtained when the lignin data using the present method were correlated with the total lignin contents. The newly developed lignin method therefore has potential to replace the Klason method, a popular but time-consuming method that is an analytical bottleneck.

In summary, disclosed herein is a novel reagent combination (strong acids and amine-thiols) that completely dissolves lignocellulosic biomass under mild conditions. Also disclosed is a new spectroscopic method for determining lignin in lignocellulosic biomass that takes advantage of this phenomenon. Compared with the currently used methods for lignin determination, the method disclosed herein has the following advantages: 1) the reagents used are easily accessible and environment-friendly; 2) the procedure is fast and is performed without heating; 3) it is sensitive; only a few milligrams of sample are needed; 4) the method provided results that are well-correlated to the total lignin content obtained by the conventional Klason method; 5) the method can be implemented in a high-throughput mode.

Examples

The following examples are included herein to provide a more complete disclosure of the method described in claimed herein. The examples do not limit the scope of the claims in any way.

Materials. All chemicals and reagents are commercial products and used as supplied. 1-cysteine, microcrystalline cellulose and xylan were purchased from Sigma-Aldrich (St. Louis, Missouri, USA). Sulfuric acid (72%, 12 M, SA) was prepared by careful dilution of concentrated (95-98%) sulfuric acid purchased from Sigma-Aldrich or purchased from Fisher Scientific (Waltham, Massachusetts, USA).

The lignocellulosic biomass materials were ground with a Wiley mill (Thomas Scientific, Swedesboro, New Jersey, USA) and sieved to collect the fraction between 40-80 mesh for analysis. To remove non-cell-wall extractives, the ground biomass was Soxhlet-extracted with benzene/alcohol (v/v 2:1) for 4 h, followed by 95% ethanol extraction for 12 h; toluene can replace benzene for safety reasons, and simply using 80% ethanol extraction alone is quite effective especially for woody biomass.[42] For monocot or grass biomass or non-woody dicots extraction with water under sonication is recommended first to remove proteins and other water-soluble components. Each solvent-extracted biomass sample was kept in a sealed glass bottle after drying in an oven at 50° C. for 48 h and placed in a vacuum desiccator over $P_2O_5$.

Monolignols (coniferyl alcohol, sinapyl alcohol, and p-coumaryl alcohol) were prepared according to the published methods.[43,44] Milled wood lignins (MWLs) were prepared from the corresponding biomass according to the procedure described by Bjorkman.[45]

Klason method. The Klason method was performed to measure the acid-insoluble lignin as well as acid-soluble lignin of biomass samples according to the NREL protocol (NREUTP-510-42618).[12,35]

Determination of lignin content by the subject lignin method. A cysteine stock solution (0.1 g/mL) in 72% SA was prepared by dissolving 10 g l-cysteine in 100 mL in SA (72% sulfuric acid). The solvent-extracted biomass sample (5-10 mg, weighed to the nearest 0.01 mg) was placed in a 4 mL glass vial, then 1.0 mL of the prepared stock solution was added. The mixture was sealed with a Teflon-lined screw cap and stirred at 24° C. (room temperature) with a magnetic stir bar (400 rpm) for 60 min, at which point the biomass had completely dissolved. The solution was diluted with deionized water to a volume of 50 mL or 100 mL in a volumetric flask, depending on the lignin content and biomass weight used to allow the diluted solution to have an appropriate UV-absorbance (<1.0) at 283 nm. Absorbance of the diluted solution was measured at 283 nm ($A_{283}$) in a 1 cm quartz cell using a UV spectrophotometer against a blank solution (1 mL stock solution was diluted to the corresponding volume). If necessary, a UV-absorption spectrum was obtained by scanning the absorbance from 230-400 nm on the spectrophotometer at 1 nm intervals. The lignin content (CASA_L %) of the lignocellulosic biomass was calculated based on the Beer-Lambert law using formula (1). All tests are performed at least in triplicate, and the mean and standard deviation tabulated.

$$CASA\_L(\%) = \frac{A283 \times V}{\varepsilon \times m_s \times L} \times 100 \quad (1)$$

Wherein where CASA_L (%) is lignin content as measured by the subject method, $A_{283}$ is the UV absorbance of the diluted solution at λ=283 nm; V is the total volume (in L) of the diluted solution; $m_s$ is the mass in grams of the extractive-free lignocellulosic sample; L is the light path length, 1 cm here; ε is the UV-absorption coefficient (absorptivity, $L \cdot mol^{-1} \cdot cm^{-1}$) of lignin at λ=283 nm.

REFERENCES

1. Zakzeski, J., Bruijnincx, P. C. A., Jongerius, A. L. & Weckhuysen, B. M. The catalytic valorization of lignin for the production of renewable chemicals. *Chemical Reviews* 110, 3552-3599 (2010).
2. Vanholme, R., Demedts, B., Morreel, K., Ralph, J. & Boerjan, W. Lignin biosynthesis and structure. *Plant Physiology* 153, 895-905 (2010).
3. Grabber, J. H. How do lignin composition, structure, and cross-linking affect degradability? A review of cell wall model studies. *Crop Science* 45, 820-831 (2005).
4. Shuai, L. et al. Comparative study of SPORL and dilute-acid pretreatments of spruce for cellulosic ethanol production. *Bioresource Technology* 101, 3106-3114 (2010).
5. Kleinert, M. & Barth, T. Towards a lignincellulosic biorefinery: Direct one-step conversion of lignin to hydrogen-enriched biofuel. *Energy & Fuels* 22, 1371-1379 (2008).
6. Boudet, A. M., Kajita, S., Grima-Pettenati, J. & Goffner, D. Lignins and lignocellulosics: a better control of synthesis for new and improved uses. *Trends in Plant Science* 8, 576-581 (2003).
7. Upton, B. M. & Kasko, A. M. Strategies for the conversion of lignin to high-value polymeric materials: Review and perspective. *Chemical Reviews* 116, 2275-2306 (2016).
8. Tuck, C. O., Perez, E., Horvath, I. T., Sheldon, R. A. & Poliakoff, M. Valorization of biomass: Deriving more value from waste. *Science* 337, 695-699 (2012).
9. Ragauskas, A. J. et al. Lignin valorization: Improving lignin processing in the biorefinery. *Science* 344, 1246843: 1-10 (2014).
10. Hatfield, R. & Fukushima, R. S. Can lignin be accurately measured? *Crop Science* 45, 832-839 (2005).
11. Templeton, D. W., Scarlata, C. J., Sluiter, J. B. & Wolfrum, E. J. Compositional analysis of lignocellulosic feedstocks. 2. Method uncertainties. *Journal of Agricultural and Food Chemistry* 58, 9054-9062 (2010).
12. Sluiter, J. B., Ruiz, R. O., Scarlata, C. J., Sluiter, A. D. & Templeton, D. W. Compositional analysis of lignocellulosic feedstocks. 1. Review and description of methods. *Journal of Agricultural and Food Chemistry* 58, 9043-9053 (2010).
13. Yoshihara, K., Kobayashi, T., Fujii, T. & Akamatsu, I. A novel modification of Klason lignin quantitative method. *Japan Tappi Journal* 38, 86-95 (1984).
14. Katahira, R., Sluiter, J. B., Schell, D. J. & Davis, M. F. Degradation of carbohydrates during dilute sulfuric acid pretreatment can interfere with lignin measurements in solid residues. *Journal of Agricultural and Food Chemistry* 61, 3286-3692 (2013).
15. Rodrigues, J., Faix, O. & Pereira, H. Determination of lignin content of *Eucalyptus globulus* wood using FTIR spectroscopy. *Holzforschung* 52, 46-50 (1998).
16. Fu, L. et al. Rapid and accurate determination of the lignin content of lignocellulosic biomass by solid-state NMR. *Fuel* 141, 39-45 (2015).
17. Jiang, N., Pu, Y. Q. & Ragauskas, A. J. Rapid determination of lignin content via direct dissolution and $^1$H NMR analysis of plant cell walls. *ChemSusChem* 3, 1285-1289 (2010).
18. Li, N., Pan, X. J. & Alexander, J. A facile and fast method for quantitating lignin in lignocellulosic biomass using acidic lithium bromide trihydrate (ALBTH). *Green Chemistry* 18, 5367-5376 (2016).
19. Browning, B. L. Methods of wood chemistry, Vol. II. (Wiley-Interscience, New York; 1967).
20. Maekawa, E., Ichizawa, T. & Koshijima, T. An evaluation of the acid-soluble lignin determination in analyses of lignin by the sulfuric-acid method. *Journal of Wood Chemistry and Technology* 9, 549-567 (1989).
21. Kaar, W. E. & Brink, D. L. Simplified analysis of acid-soluble lignin. *Journal of Wood Chemistry and Technology* 11, 465-477 (1991).
22. Morrison, I. M. Semimicro method for the determination of lignin and its use in predicting the digestibility of forage crops. *Journal of the Science of Food and Agriculture* 23, 455-463 (1972).
23. Morrison, I. M. Improvements in the acetyl bromide technique to determine lignin and digestibility and its application to legumes. *Journal of the Science of Food and Agriculture* 23, 1463-1469 (1972).
24. Moreira-Vilar, F. C. et al. The acetyl bromide method is faster, simpler and presents best recovery of lignin in different herbaceous tissues than Klason and thioglycolic acid methods. *PLOS ONE* 9 (2014).
25. Bagley, M., Cunningham, R. L. & Maloney, R. L. Ultraviolet spectral determination of lignin. *Tappi* 56, 162-163 (1973).
26. Dence, C. W. in Methods in Lignin Chemistry. (eds. S. Y. Lin & C. W. Dence) 33-61 (Springer-Verlag, Heidelberg; 1992).
27. Boutelje, J. & Jonsson, U. Ultraviolet microscope photometry of pulp fibers. UV-absorbance and its relationship to chlorine number, kappa number and lignin content. *Cellulose Chemistry and Technology* 14, 53-67 (1980).
28. Fergus, B. J. & Goring, D. A. I. The distribution of lignin in birchwood as determined by ultraviolet microscopy. *Holzforschung* 24, 118-24 (1970).
29. Schultz, T., Templeteon, M. & McGinnis, G. Rapid determination of lignocellulose by diffuse reflectance Fourier transform infrared spectrometry. *Analytical Chemistry* 57, 2867-2869 (1985).
30. Lu, F. & Ralph, J. Non-degradative dissolution and acetylation of ball-milled plant cell walls; high-resolution solution-state NMR. *The Plant Journal* 35, 535-544 (2003).
31. Kim, H. & Ralph, J. Solution-state 2D NMR of ball-milled plant cell wall gels in DMSO-$d_6$/pyridine-$d_5$. *Organic & Biomolecular Chemistry* 8, 576-591 (2010).
32. Haw, J. F., Maciel, G. E. & Schroeder, H. A. Carbon-13 nuclear magnetic resonance spectrometric study of wood and wood pulping with cross-polarization and magic-angle spinning. *Analytical Chemistry* 56, 1323-1329 (1984).
33. Freudenberg, K. Beitrage zur Erforschung des Lignins. *Angewandte Chemie* 68, 508-512 (1956).
34. Kirk, T. K., Connors, W. J., Bleam, W. D. & Hackett, W. F., Zeikus, J. G. Preparation and microbial decomposition of synthetic (14C) lignins. *Por. Nat. Acad. Sci. USA* 72, 2513-2519 (1975).
35. Sluiter, A. et al. in Laboratory Analytical Procedure (LAP)-Technical Report (nrel.gov/docs/gen/fy13/42618.pdf) (National Renewable Energy Laboratory, Golden, CO, USA; 2012).
36. Chesson, A. Effects of sodium-hydroxide on cereal straws in relation to the enhanced degradation of structural polysaccharides by rumen microorganisms. *Journal of the Science of Food and Agriculture* 32, 745-758 (1981).
37. Brillouet, J. M. & Riochet, D. Cell-wall polysaccharides and lignin in cotyledons and hulls of seeds from various lupin (*Lupinus* L) species. *Journal of the Science of Food and Agriculture* 34, 861-868 (1983).
38. Iiyama, K. & Wallis, A. F. A. An improved acetyl bromide procedure for determining lignin in woods and wood pulps. *Wood Science and Technology* 22, 271-280 (1988).
39. Fukushima, R. S., Dehority, B. A. & Loerch, S. C. Modification of a Colorimetric Analysis for Lignin and Its Use in Studying the Inhibitory Effects of Lignin on Forage Digestion by Ruminal Microorganisms. *Journal of Animal Science* 69, 295-304 (1991).
40. Fukushima, R. S. & Dehority, B. A. Feasibility of using lignin isolated from forages by solubilization in acetyl bromide as a standard for lignin analyses. *Journal of Animal Science* 78, 3135-3143 (2000).
41. Fukushima, R. S. & Hatfield, R. D. Extraction and isolation of lignin for utilization as a standard to determine lignin concentration using the acetyl bromide spectrophotometric method. *Journal of Agricultural and Food Chemistry* 49, 3133-3139 (2001).
42. Theander, O. Chemical analysis of lignocellulose materials. *Animal Feed Science and Technology* 32, 35-44 (1991).
43. Quideau, S. & Ralph, J. Facile large-scale synthesis of coniferyl, sinapyl, and p-coumaryl alcohol. *Journal of Agricultural and Food Chemistry* 40, 1108-1110 (1992).
44. Kim, H. & Ralph, J. Simplified preparation of coniferyl and sinapyl alcohols. *Journal of Agricultural and Food Chemistry* 53, 3693-3695 (2005).
45. Björkman, A. Isolation of lignin from finely divided wood with neutral solvents. *Nature* 174, 1057-1058 (1954).

What is claimed is:

1. A method of dissolving biomass, including lignocellulosic biomass, the method comprising contacting an amount of biomass with an amount of an aqueous solution comprising a strong acid and an amine-thiol, wherein the amount of the aqueous solution is sufficient to completely dissolve the biomass.

2. The method of claim 1, wherein the strong acid is selected from the group consisting of chloric acid ($HClO_3$), perchloric acid ($HClO_4$), hydrochloric acid (HCl), hydrobromic acid (HBr), hydroiodic acid (HI), nitric acid ($HNO_3$), phosphoric ($H_3PO_4$), and sulfuric acid ($H_2SO_4$).

3. The method of claim 1, wherein the strong acid is sulfuric acid.

4. The method of claim 1, wherein the amine-thiol is cysteine.

5. The method of claim 1, wherein the strong acid is sulfuric acid and the amine-thiol is cysteine.

6. The method of claim 1, wherein the method is conducted at a temperature of from about 20° C. to 30° C.

7. The method of claim 1, wherein the aqueous solution comprises about 12 M strong acid and about 0.1 g/mL of amine-thiol.

8. The method of claim 1, wherein the aqueous solution comprises about 12 M sulfuric acid and about 0.1 g/mL of cysteine.

9. A method of measuring lignin concentration in biomass, the method comprising:
   (a) dissolving a sample of biomass suspected of containing lignocellulose in an aqueous solution comprising a strong acid and an amine-thiol to yield a first solution; and
   (b) measuring absorbance of the first solution at a wavelength of about 283 nm; and
   (c) determining lignin concentration in the first solution by comparing the measured absorbance in step (b) to a standard curve of absorbance values made from solutions of known lignin concentration.

10. The method of claim 9, wherein the strong acid is selected from the group consisting of chloric acid ($HClO_3$), perchloric acid ($HClO_4$), hydrochloric acid (HCl), hydrobromic acid (HBr), hydroiodic acid (HI), nitric acid ($HNO_3$), phosphoric ($H_3PO_4$), and sulfuric acid ($H_2SO_4$).

11. The method of claim 9, wherein the strong acid is sulfuric acid.

12. The method of claim 9, wherein the amine-thiol is cysteine.

13. The method of claim 9, wherein the strong acid is sulfuric acid and the amine-thiol is cysteine.

14. The method of claim 9, wherein steps (a) and (b) are conducted a temperature of from about 20° C. to 30° C.

15. The method of claim 9, wherein the aqueous solution of step (a) comprises about 12 M strong acid and about 0.1 g/mL of amine-thiol.

16. The method of claim 9, wherein the aqueous solution of step (a) comprises about 12 M sulfuric acid and about 0.1 g/mL of cysteine.

* * * * *